(12) United States Patent
Son

(10) Patent No.: US 9,632,215 B2
(45) Date of Patent: Apr. 25, 2017

(54) LENS MODULE

(71) Applicant: SAMSUNG ELECTRO-MECHANICS CO., LTD., Suwon-si (KR)

(72) Inventor: Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 239 days.

(21) Appl. No.: 14/146,128

(22) Filed: Jan. 2, 2014

(65) Prior Publication Data

US 2015/0109684 A1    Apr. 23, 2015

(30) Foreign Application Priority Data

Oct. 23, 2013  (KR) .................. 10-2013-0126827

(51) Int. Cl.
*G02B 7/02* (2006.01)
*G02B 3/04* (2006.01)
*G02B 13/00* (2006.01)

(52) U.S. Cl.
CPC ........... *G02B 3/04* (2013.01); *G02B 13/0045* (2013.01)

(58) Field of Classification Search
CPC .................................................. G02B 13/0045
USPC ......................................................... 359/713
See application file for complete search history.

(56) References Cited

U.S. PATENT DOCUMENTS

| | | | |
|---|---|---|---|
| 6,061,185 A | 5/2000 | Yamada | |
| 8,385,006 B2 | 2/2013 | Tsai et al. | |
| 8,477,431 B2 | 7/2013 | Huang | |
| 2006/0056042 A1 | 3/2006 | Kim et al. | |
| 2010/0118416 A1* | 5/2010 | Do | G02B 7/028 359/716 |
| 2012/0194726 A1 | 8/2012 | Huang et al. | |
| 2012/0243108 A1 | 9/2012 | Tsai et al. | |
| 2012/0314301 A1 | 12/2012 | Huang et al. | |
| 2012/0314304 A1 | 12/2012 | Huang | |
| 2015/0085135 A1* | 3/2015 | Chen | G02B 9/62 348/164 |

FOREIGN PATENT DOCUMENTS

| | | |
|---|---|---|
| CN | 202067015 U | 12/2011 |
| CN | 102819095 A | 12/2012 |
| JP | 10-253883 A | 9/1998 |
| JP | 2006-72295 A | 3/2006 |

OTHER PUBLICATIONS

Office Action dated Sep. 24, 2014 for Korean Patent Application No. 10-2013-0126827 and its English summary provided by Applicant's foreign counsel.
Chinese Office Action issued on Jun. 21, 2016, in counterpart Chinese Application No. 201410023125.6 (12 pages in English, 8 pages in Chinese).

* cited by examiner

*Primary Examiner* — James Jones
(74) *Attorney, Agent, or Firm* — NSIP Law

(57) ABSTRACT

There is provided a lens module including: a first lens having positive refractive power; a second lens having positive refractive power; a third lens having negative refractive power; a fourth lens having refractive power; a fifth lens having positive refractive power; and a sixth lens having refractive power and a shape in which an image side surface thereof is concave toward an image side.

29 Claims, 30 Drawing Sheets

LENS MODULE

CROSS-REFERENCE TO RELATED APPLICATION

This application claims the benefit of Korean Patent Application No. 10-2013-0126827 filed on Oct. 23, 2013, with the Korean Intellectual Property Office, the disclosure of which is incorporated in its entirety herein by reference.

BACKGROUND

The present disclosure relates to a lens module having an optical system composed of six lenses.

In general, a camera for a portable terminal includes a lens module and an image pickup device (or an imaging device).

Here, the lens module includes a plurality of lenses, and the plurality of lenses constitutes an optical system projecting an image of a subject onto the imaging device. An element such as a charge-coupled device (CCD), or the like, is used as the imaging device, and in general, the imaging device has a pixel size greater than or equal to 1.4 μm.

Meanwhile, as portable terminals and cameras have been decreased in size, a pixel size of the imaging devices has been reduced to 1.12 μm or smaller, and thus, it is required to develop a bright lens module that may implement high resolution even with such conditions.

For reference, related art includes patent documents 1 and 2.

RELATED ART DOCUMENT (Patent Document 1) US2012-0243108 A1
(Patent Document 2) US2012-0314301 A1

SUMMARY

An aspect of the present disclosure may provide a lens module capable of enhancing an aberration improvement effect, implementing high resolution, and satisfying requirements of a light weight and low cost.

An aspect of the present disclosure may also provide a bright lens module (low F no.) including an iris for vignetting.

According to an aspect of the present disclosure, a lens module may include: a first lens having positive refractive power; a second lens having positive refractive power; a third lens having negative refractive power; a fourth lens having refractive power; a fifth lens having positive refractive power; and a sixth lens having refractive power and a shape in which an image side surface thereof is concave toward an image side.

A first iris may be provided on an object side of the first lens.

The first lens may have a shape in which an object side surface thereof is convex toward an object side.

The second lens may have a shape in which both surfaces thereof are convex.

The third lens may have a shape in which both surfaces thereof are concave.

The fourth lens may have a meniscus shape and be convex toward the object side.

The fifth lens may have a shape in which an image side surface thereof is concave toward the image side.

The fifth lens may have a meniscus shape and be convex toward the image side.

The sixth lens may have a shape in which the image side surface thereof is concave toward the image side.

The sixth lens may have at least one point of inflection formed on the image side surface thereof.

The first lens to the sixth lens may be formed of plastic.

At least one of an object side surface and an image side surface of each of the first lens to the sixth lens may be an aspherical surface.

The lens module may satisfy conditional expression 1:

$$TTL/IMGH<2.0 \quad \text{[Conditional Expression 1]}$$

wherein TTL is a distance (mm) from an object side surface of the first lens to an image surface, and IMGH is a diagonal length (mm) of an image sensor.

The lens module may satisfy conditional expression 2:

$$0.7<SL/TTL<1.1 \quad \text{[Conditional Expression 2]}$$

wherein SL is a distance (mm) from a first iris to an image surface, and TTL is a distance (mm) from an object side surface of the first lens to the image surface.

The lens module may satisfy conditional expression 3:

$$ANG/F\,no.>33 \quad \text{[Conditional Expression 3]}$$

wherein ANG is a field of view of the lens module and F no. indicates brightness of the lens module.

The lens module may satisfy conditional expression 4:

$$F\,no.<2.3 \quad \text{[Conditional Expression 4]}$$

wherein F no. indicates brightness of the lens module.

The lens module may satisfy conditional expression 5:

$$6<ANG/(F\,no.*TTL)<11 \quad \text{[Conditional Expression 5]}$$

wherein ANG is a field of view of the lens module, F no. indicates brightness of the lens module, and TTL is a distance (mm) from an object side surface of the first lens to an image surface.

The lens module may satisfy conditional expression 6:

$$0.44<L1S1/EFL<0.66 \quad \text{[Conditional Expression 6]}$$

wherein L1S1 is a diameter (mm) of an object side surface of the first lens, and EFL is an effective focal length of the lens module.

According to another aspect of the present disclosure, a lens module may include: a first lens having positive refractive power; a second lens having positive refractive power; a third lens having negative refractive power; a fourth lens having refractive power; a fifth lens having positive refractive power; and a sixth lens having refractive power, a shape in which an image side surface thereof is concave toward an image side, and at least one point of inflection thereon, wherein a first iris may be provided on an object side of the first lens and a second iris may be provided between the second lens and the third lens.

The first lens may have a shape in which an object side surface thereof is convex toward an object side.

The second lens may have a shape in which both surfaces thereof are convex.

The fifth lens may have a shape in which an image side surface thereof is convex toward the image side.

The sixth lens may have a shape in which the image side surface thereof is concave toward the image side.

A third iris may be provided between the third lens and the fourth lens.

The lens module may satisfy conditional expression 1:

$$TTL/IMGH<2.0 \quad \text{[Conditional Expression 1]}$$

wherein TTL is a distance (mm) from an object side surface of the first lens to an image surface, and IMGH is a diagonal length (mm) of an image sensor.

The lens module may satisfy conditional expression 2:

$$0.7 < SL/TTL < 1.1 \qquad \text{[Conditional Expression 2]}$$

wherein SL is a distance (mm) from a first iris to an image surface, and TTL is a distance (mm) from an object side surface of the first lens to the image surface.

The lens module may satisfy conditional expression 3:

$$ANG/F\,no. > 33 \qquad \text{[Conditional Expression 3]}$$

wherein ANG is a field of view of the lens module and F no. indicates brightness of the lens module.

The lens module may satisfy conditional expression 4:

$$F\,no. < 2.3 \qquad \text{[Conditional Expression 4]}$$

wherein F no. indicates brightness of the lens module.

The lens module may satisfy conditional expression 5:

$$6 < ANG/(F\,no.*TTL) < 11 \qquad \text{[Conditional Expression 5]}$$

wherein ANG is a field of view of the lens module, F no. indicates brightness of the lens module, and TTL is a distance (mm) from an object side surface of the first lens to an image surface.

The lens module may satisfy conditional expression 6:

$$0.44 < L1S1/EFL < 0.66 \qquad \text{[Conditional Expression 6]}$$

wherein L1S1 is a diameter (mm) of an object side surface of the first lens, and EFL is an effective focal length of the lens module.

According to another aspect of the present disclosure, a lens module may include: a first lens having positive refractive power; a second lens having positive refractive power; a third lens having negative refractive power; a fourth lens having negative refractive power; a fifth lens having positive refractive power; and a sixth lens having refractive power, a shape in which an image side surface thereof is concave toward an image side, and at least one point of inflection thereon.

A first iris may be provided between the second lens and the third lens.

A second iris may be provided on an object side of the first lens, and a third iris may be provided between the third lens and the fourth lens.

The fifth lens may have a shape in which an image side surface thereof is convex toward the image side.

The sixth lens may have a shape in which the image side surface thereof is concave toward the image side.

The lens module may satisfy conditional expression 1:

$$TTL/IMGH < 2.0 \qquad \text{[Conditional Expression 1]}$$

wherein TTL is a distance (mm) from an object side surface of the first lens to an image surface, and IMGH is a diagonal length (mm) of an image sensor.

The lens module may satisfy conditional expression 2:

$$0.7 < SL/TTL < 1.1 \qquad \text{[Conditional Expression 2]}$$

wherein SL is a distance (mm) from a first iris to an image surface, and TTL is a distance (mm) from an object side surface of the first lens to the image surface.

The lens module may satisfy conditional expression 3:

$$ANG/F\,no. > 33 \qquad \text{[Conditional Expression 3]}$$

wherein ANG is a field of view of the lens module and F no. indicates brightness of the lens module.

The lens module may satisfy conditional expression 4:

$$F\,no. < 2.3 \qquad \text{[Conditional Expression 4]}$$

wherein F no. indicates brightness of the lens module.

The lens module may satisfy conditional expression 5:

$$6 < ANG/(F\,no.*TTL) < 11 \qquad \text{[Conditional Expression 5]}$$

wherein ANG is a field of view of the lens module, F no. indicates brightness of the lens module, and TTL is a distance (mm) from an object side surface of the first lens to an image surface.

The lens module may satisfy conditional expression 6:

$$0.44 < L1S1/EFL < 0.66 \qquad \text{[Conditional Expression 6]}$$

wherein L1S1 is a diameter (mm) of an object side surface of the first lens, and EFL is an effective focal length of the lens module.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
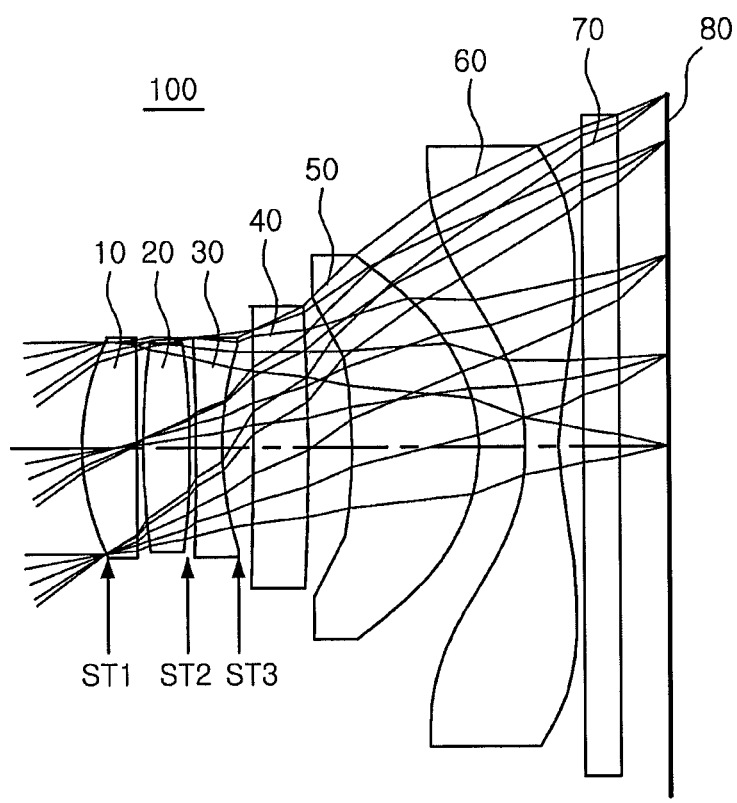
FIG. 1 is a view illustrating a configuration of a lens module according to a first exemplary embodiment of the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

A first lens refers to a lens closest to an object, and a sixth lens refers to a lens closest to an image.

A front side refers to a side in a lens module close to the object, and a rear side refers to a side in the lens module close to an image sensor or an image. Also, in each lens, a first surface refers to a surface close to an object (i.e., an object side surface (outward from the camera or toward the object that is being imaged)) and a second surface refers to a surface close to an image (i.e., an image side surface (toward the inside of the camera or an image capturing device)). Also, in the present disclosure, units of a radius of curvature and a thickness of each lens, TTL, SL, IMGH, a total focal length of an optical system, and a focal length of each lens are mm.

In addition, in descriptions of shapes of lenses, when one surface has a convex shape, it indicates that an optical axis of the corresponding surface is convex, and when one surface has a concave shape, it indicates that an optical axis of the corresponding surface is concave. Thus, even if it is described that one surface of a lens has a convex shape, edges of the lens may be concave. Similarly, even if it is described that one surface of a lens has a concave shape, edges of the lens may be convex.

A lens module according to an exemplary embodiment of the present disclosure may include an optical system including six lenses.

Namely, the lens module according to the exemplary embodiment of the present disclosure may include a first lens 10, a second lens 20, a third lens 30, a fourth lens 40, a fifth lens 50, and a sixth lens 60.

However, the lens module according to the exemplary embodiment of the present disclosure may not only be composed of six lenses, and may further include any other components as necessary. For example, the lens module may include an iris (ST) for adjusting a quantity of light. The lens module may further include an infrared (IR) cutoff filter 70 for cutting off infrared rays. Also, the lens module may further include an image sensor 80 for converting a received image of a subject into an electrical signal. The lens module may further include a space maintaining member for adjusting a distance between lenses.

The first lens 10 to the sixth lens 60 constituting the lens module according to the exemplary embodiment of the present disclosure may be formed of a plastic material.

At least one of the first lens 10 to the sixth lens 60 may have an aspherical surface. Also, the first lens 10 to the sixth lens 60 may each have at least one aspherical surface.

Namely, at least one of a first surface and a second surface of each of the first lens 10 to the sixth lens 60 may be an aspherical surface.

F no. of the optical system composed of the first lens 10 to the sixth lens 60 may be smaller than 2.3.

In this case, a subject may be imaged clearly. For example, the lens module according to the exemplary embodiment of the present disclosure may image a subject clearly under a low illuminance condition (e.g., below 100 lux).

The lens module according to the exemplary embodiment of the present disclosure may satisfy conditional expression 1.

$$TTL/IMGH<2.0 \qquad \text{[Conditional Expression 1]}$$

In conditional expression 1, TTL is a distance (mm) from an object side surface of the first lens to an image surface, and IMGH is a diagonal length (mm) of the image surface (i.e., the image sensor).

Here, if the lens module has a value exceeding an upper limit value of the conditional expression 1, TTL may be too large, rendering it difficult for the lens module to be installed in a portable electronic device.

The lens module according to the exemplary embodiment of the present disclosure may satisfy conditional expression 2.

$$0.7<SL/TTL<1.1 \qquad \text{[Conditional Expression 2]}$$

In conditional expression 2, SL is a distance from a first iris to the image surface, and TTL is a distance (mm) from the object side surface of the first lens to the image surface.

Here, if the lens module has a value lower than a lower limit value of conditional expression 2, an aperture stop and the image surface may be too closely positioned, causing an incident angle from the sixth lens to the image surface to increase. Also, if the lens module has a value exceeding an upper limit value of conditional expression 2, a distance between the aperture stop and the image surface may be too far, rendering it difficult to reduce the size of the lens module.

The lens module according to the exemplary embodiment of the present disclosure may satisfy conditional expression 3.

$$ANG/F\,no.>33 \qquad \text{[Conditional Expression 3]}$$

In conditional expression 3, ANG is a field of view (or an angle of view) of the optical system, and F no. is a numerical value indicating brightness of the optical system.

The lens module according to the exemplary embodiment of the present disclosure may satisfy conditional expression 4.

$$F\,no.<2.3 \qquad \text{[Conditional Expression 4]}$$

In conditional expression 4, F no. is a numerical value indicating brightness of the optical system.

Here, the optical system satisfying conditional expression 4 may capture a clear image even in a low illuminance environment.

The lens module according to the exemplary embodiment of the present disclosure may satisfy conditional expression 5.

$6<ANG/(F no.*TTL)<11$     [Conditional Expression 5]

In conditional expression 5, ANG is a field of view of the optical system, F no. is a numerical value indicating brightness of the optical system, and TTL is a distance (mm) from the object side of the first lens to the image surface.

The lens module according to the exemplary embodiment of the present disclosure may satisfy conditional expression 6.

$0.44<L1S1/EFL<0.66$     [Conditional Expression 6]

In conditional expression 6, L1S1 is a diameter of the object side surface of the first lens, and EFL is a total focal length (mm) of the optical system.

Hereinafter, the first lens 10 to the sixth lens 60 constituting the lens module according to the exemplary embodiment of the present disclosure will be described.

The first lens 10 may have positive refractive power. A first surface of the first lens 10 may be convex and a second surface thereof may be concave. For example, the first lens 10 may have a meniscus shape, bulging toward the object side. Alternatively, both surfaces of the first lens 10 may be convex.

At least one of the first surface and the second surface of the first lens 10 may be an aspherical surface. For example, both surfaces of the first lens 10 may be aspherical surfaces.

The first lens 10 may be formed of a material having a high degree of light transmittance and excellent processibility. For example, the first lens 10 may be formed of plastic. However, a material of the first lens 10 is not limited thereto. For example, the first lens 10 may be formed of glass.

The second lens 20 may have positive refractive power. Both surfaces of the second lens 20 may be convex.

At least one of a first surface and a second surface of the second lens 20 may be an aspherical surface. For example, both surfaces of the second lens 20 may be aspherical surfaces.

The second lens 20 may be formed of a material having a high degree of light transmittance and excellent processibility. For example, the second lens 20 may be formed of plastic. However, a material of the second lens 20 is not limited thereto. For example, the second lens 20 may be formed of glass.

The third lens 30 may have refractive power. For example, the third lens may have negative refractive power.

Both surfaces of the third lens 30 may be concave. Alternatively, a first surface of the third lens 30 may be convex, and a second surface thereof may be concave. For example, the third lens 30 may have a meniscus shape, bulging toward the object side, or may have a plano-convex shape, bulging toward the object side.

At least one of the first surface and the second surface of the third lens 30 may be an aspherical surface. For example, both surfaces of the third lens 30 may be aspherical surfaces.

The third lens 30 may be formed of a material having a high degree of light transmittance and excellent processibility. For example, the third lens 30 may be formed of plastic. However, a material of the third lens 30 is not limited thereto. For example, the third lens 30 may be formed of glass.

The fourth lens 40 may have refractive power. For example, the fourth lens 40 may have positive or negative refractive power.

Both surfaces of the fourth lens 40 may be convex. Alternatively, a first surface of the fourth lens 40 may be convex, and a second surface thereof may be concave. For example, the fourth lens 40 may have a meniscus shape, bulging toward the object side, or may have a plano-convex shape, bulging toward the object side. Alternatively, the first surface of the fourth lens 40 may be concave, and the second surface thereof may be convex. For example, the fourth lens 40 may have a meniscus shape, bulging toward the image side, or may have a plano-convex shape, bulging toward the image side.

At least one of the first surface and the second surface of the fourth lens 40 may be an aspherical surface. For example, both surfaces of the fourth lens 40 may be aspherical surfaces.

The fourth lens 40 may be formed of a material having a high degree of light transmittance and excellent processibility. For example, the fourth lens 40 may be formed of plastic. However, a material of the fourth lens 40 is not limited thereto. For example, the fourth lens 40 may be formed of glass.

The fifth lens 50 may have positive refractive power. A first surface of the fifth lens 50 may be concave, and a second surface thereof may be convex. For example, the fifth lens 50 may have a meniscus shape, bulging toward the image side. Alternatively, both surfaces of the fifth lens 50 may be convex.

At least one of the first surface and the second surface of the fifth lens 50 may be an aspherical surface. For example, both surfaces of the fifth lens 50 may be aspherical surfaces.

The fifth lens 50 may be formed of a material having a high degree of light transmittance and excellent processibility. For example, the fifth lens 50 may be formed of plastic. However, a material of the fifth lens 50 is not limited thereto. For example, the fifth lens 50 may be formed of glass.

The sixth lens 60 may have refractive power. For example, the sixth lens 60 may have positive or negative refractive power.

A first surface of the sixth lens 60 may be convex, and a second surface thereof may be concave. In addition, the sixth lens 60 may have a shape in which a point of inflection is formed on at least one surface. For example, the second surface of the sixth lens 60 may have a shape in which it is concave at the center of an optical axis and becomes convex toward the edges thereof. Alternatively, both surfaces of the sixth lens 60 may be concave.

At least one of the first surface and the second surface of the sixth lens 60 may be an aspherical surface. For example, both surfaces of the sixth lens 60 may be aspherical surfaces.

The sixth lens 60 may be formed of a material having a high degree of light transmittance and excellent processibility. For example, the sixth lens 60 may be formed of plastic. However, a material of the sixth lens 60 is not limited thereto. For example, the sixth lens 60 may be formed of glass.

The lens module configured as described above may improve aberration, a factor degrading image quality. In addition, the lens module configured as described above may have enhanced resolution, and may facilitate reducing weight and lowering manufacturing costs.

A lens module according to a first exemplary embodiment of the present disclosure will be described with reference to FIGS. 1 through 3.

A lens module 100 according to the first exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. Both surfaces of the third lens 30 may be concave.

The fourth lens 40 may have positive refractive power. A first surface of the fourth lens 40 may be convex and a second surface thereof may be concave.

The fifth lens 50 may have positive refractive power. A first surface of the fifth lens 50 may be concave and a second surface thereof may be convex.

The sixth lens 60 may have negative refractive power. Both surfaces of the sixth lens 60 may be concave. Also, the sixth lens 60 may have a point of inflection on a surface thereof. For example, the second surface of the sixth lens 60 may have a point of inflection thereon.

The lens module 100 according to the first exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 100 according to the first exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the first exemplary embodiment of the present disclosure, a total focal length f of the lens module 100 is 4.0 mm, F No. is 2.20, ANG is 74.0, and IMGH is 6.1 mm.

Figure 2:
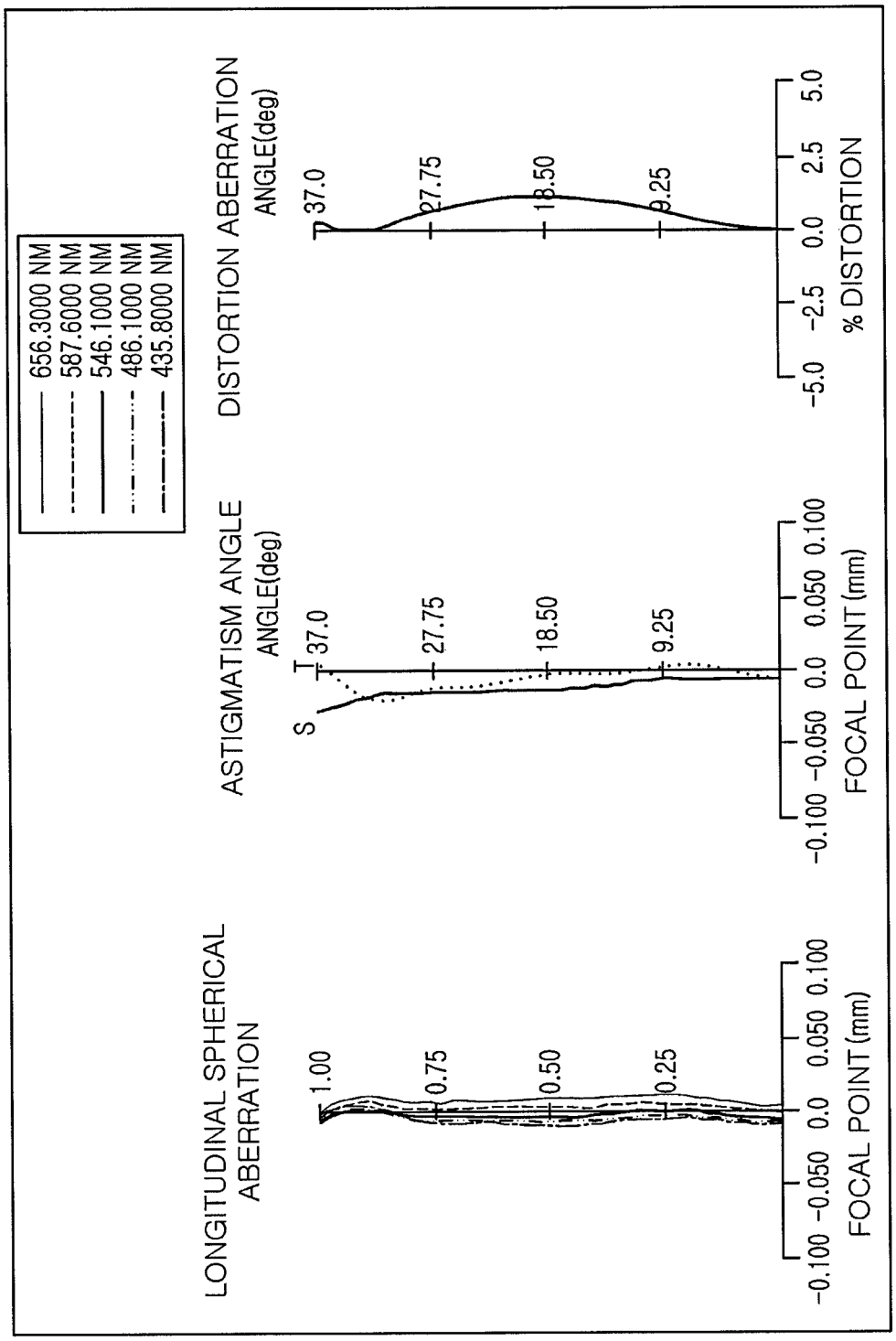
FIGS. 2 and 3 are views illustrating aberration characteristics of the lens module according to the first exemplary embodiment of the present disclosure.
Figure 3:
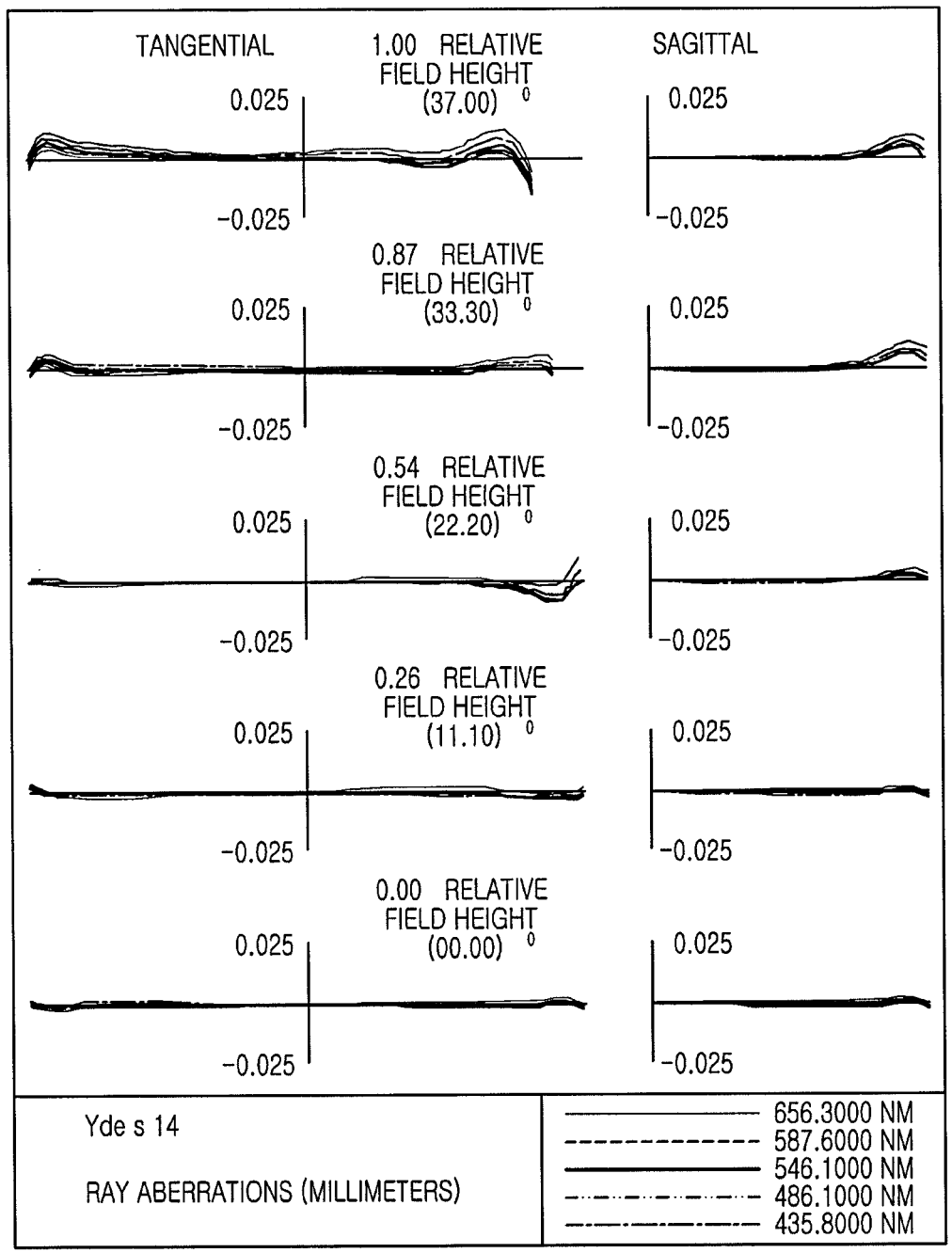

The lens module 100 configured as described above may have the aberration characteristics illustrated in FIGS. 2 and 3.

Table 1 shows lens characteristics (radii of curvature, thicknesses of lenses or distances between lenses, refractive indices, and Abbe numbers) of the lens module 100 according to the first exemplary embodiment of the present disclosure.

TABLE 1

|  | Radius of curvature | Thickness | Refractive index | Abbe number |
|---|---|---|---|---|
| Iris | 2.0088337 | 0.4566377 | 1.5441 | 56.092784 |
| s2 | 13.587275 | 0.0580957 |  |  |
| s3 | 5.257008 | 0.4021391 | 1.5441 | 56.092784 |
| s4 | −23.75683 | 0.06 |  |  |
| s5 | −27.05813 | 0.23 | 1.6398 | 23.265455 |
| s6 | 3.4517829 | 0.2665029 |  |  |
| s7 | 10.557887 | 0.4740074 | 1.5441 | 56.092784 |
| s8 | 15.90955 | 0.3716147 |  |  |
| s9 | −65.09816 | 1.1235384 | 1.5441 | 56.092784 |
| s10 | −1.318842 | 0.397449 |  |  |
| s11 | −2.015662 | 0.3 | 1.5441 | 56.092784 |
| s12 | 2.3538042 | 0.2066776 |  |  |
| s13 | 1.00E+18 | 0.3 | 1.516798 | 64.1983 |
| s14 | 1.00E+18 | 0.444696 |  |  |
| s15 | 1.00E+18 | 0.0053333 |  |  |

Meanwhile, the surfaces of the first lens 10 to the sixth lens 60 may have the respective aspheric surface coefficients as shown in Table 2. Namely, all of the second surface of the first lens 10 to the second surface of the sixth lens 60 may be aspherical surfaces.

TABLE 2

|  | s1 | s2 | s3 | s4 | s5 | s6 | s7 |
|---|---|---|---|---|---|---|---|
| Conic constant (k) | −0.551424 | 0 | 0 | −16.66245 | −19.99363 | 8.5340953 | 0.1281724 |
| 4-th order coefficient (A) | −0.018215 | −0.092472 | −0.082016027 | 0.0648667 | 0.1135815 | −0.003994 | −0.121948 |
| 6-th order coefficient (B) | 0.0389436 | −0.106451 | −0.131421504 | −0.518652 | −0.507758 | −0.094021 | 0.115468 |
| 8-th order coefficient (C) | −0.270116 | 0.6173665 | 0.679212156 | 1.0553254 | 1.0879742 | 0.2856479 | −0.285361 |
| 10-th order coefficient (D) | 0.6764391 | −1.244056 | −1.172803498 | −1.145062 | −1.289554 | −0.411761 | 0.6550062 |
| 12-th order coefficient (E) | −1.006964 | 1.4498034 | 1.312811664 | 0.6449387 | 0.800082 | 0.3215577 | −0.809356 |
| 14-th order coefficient (F) | 0.8016515 | −0.816275 | −0.769564093 | −0.156291 | −0.251306 | −0.155536 | 0.5434539 |
| 16-th order coefficient (G) | −0.25408 | 0.1553962 | 0.149055393 |  | 0.0491995 | 0.041794 | −0.158435 |

|  | s8 | s9 | s10 | s11 | s12 |
|---|---|---|---|---|---|
| Conic constant (k) | −5.100297 | 3.18E−05 | −0.558525 | −1.685873 | −13.17986 |

TABLE 2-continued

|  | | | | | |
|---|---|---|---|---|---|
| 4-th order coefficient (A) | −0.115548 | −0.098576 | 0.0931407 | −0.030406 | −0.042226 |
| 6-th order coefficient (B) | 0.0980215 | 0.0124324 | −0.099096 | −0.017605 | 0.0099327 |
| 8-th order coefficient (C) | −0.138323 | −0.01181 | 0.0965061 | 0.0254923 | −0.001225 |
| 10-th order coefficient (D) | 0.1744531 | −0.031503 | −0.068248 | −0.009454 | −2.14E−05 |
| 12-th order coefficient (E) | −0.117082 | 0.0434639 | 0.0291981 | 1.75E−03 | 8.68E−06 |
| 14-th order coefficient (F) | 0.0476079 | −0.018624 | −0.006244 | −0.000168 | 1.27E−06 |
| 16-th order coefficient (G) | −0.009619 | 0.0025502 | 0.0005084 | 6.64E−06 | −1.56E−07 |

Figure 4:
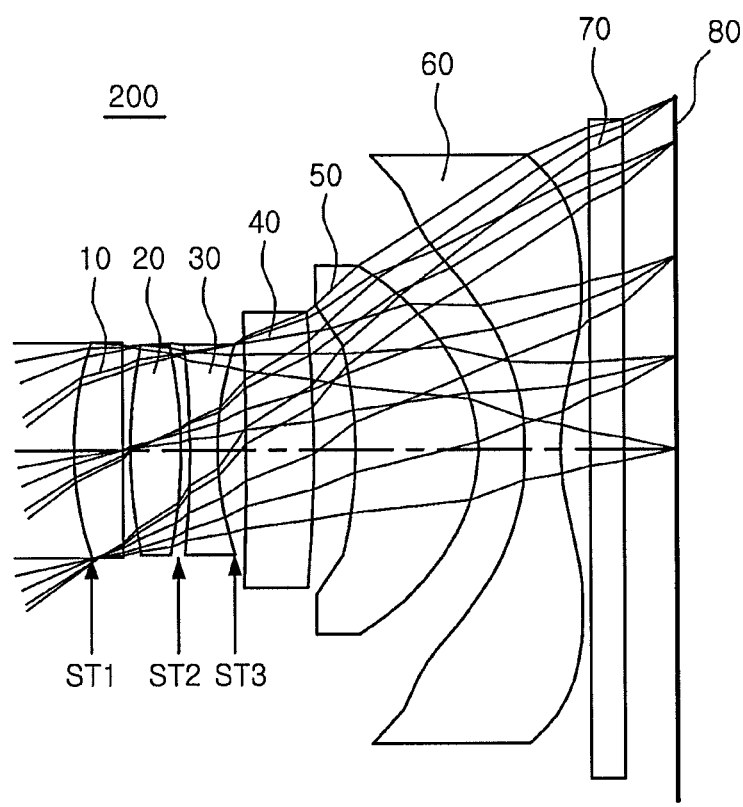
FIG. 4 is a view illustrating a configuration of a lens module according to a second exemplary embodiment of the present disclosure.

A lens module according to a second exemplary embodiment of the present disclosure will be described with reference to FIGS. 4 through 6.

A lens module 200 according to the second exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. Both surfaces of the third lens 30 may be concave.

The fourth lens 40 may have positive refractive power. A first surface of the fourth lens 40 may be convex and a second surface thereof may be concave.

The fifth lens 50 may have positive refractive power. A first surface of the fifth lens 50 may be concave and a second surface thereof may be convex.

The sixth lens 60 may have negative refractive power. Both surfaces of the sixth lens 60 may be concave. Also, the sixth lens 60 may have a point of inflection on a surface thereof. For example, the second surface of the sixth lens 60 may have a point of inflection thereon.

The lens module 200 according to the second exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 200 according to the second exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the second exemplary embodiment of the present disclosure, a total focal length f of the lens module 200 is 4.0 mm, F No. is 2.20, ANG is 74.0, and IMGH is 6.1 mm.

Figure 5:
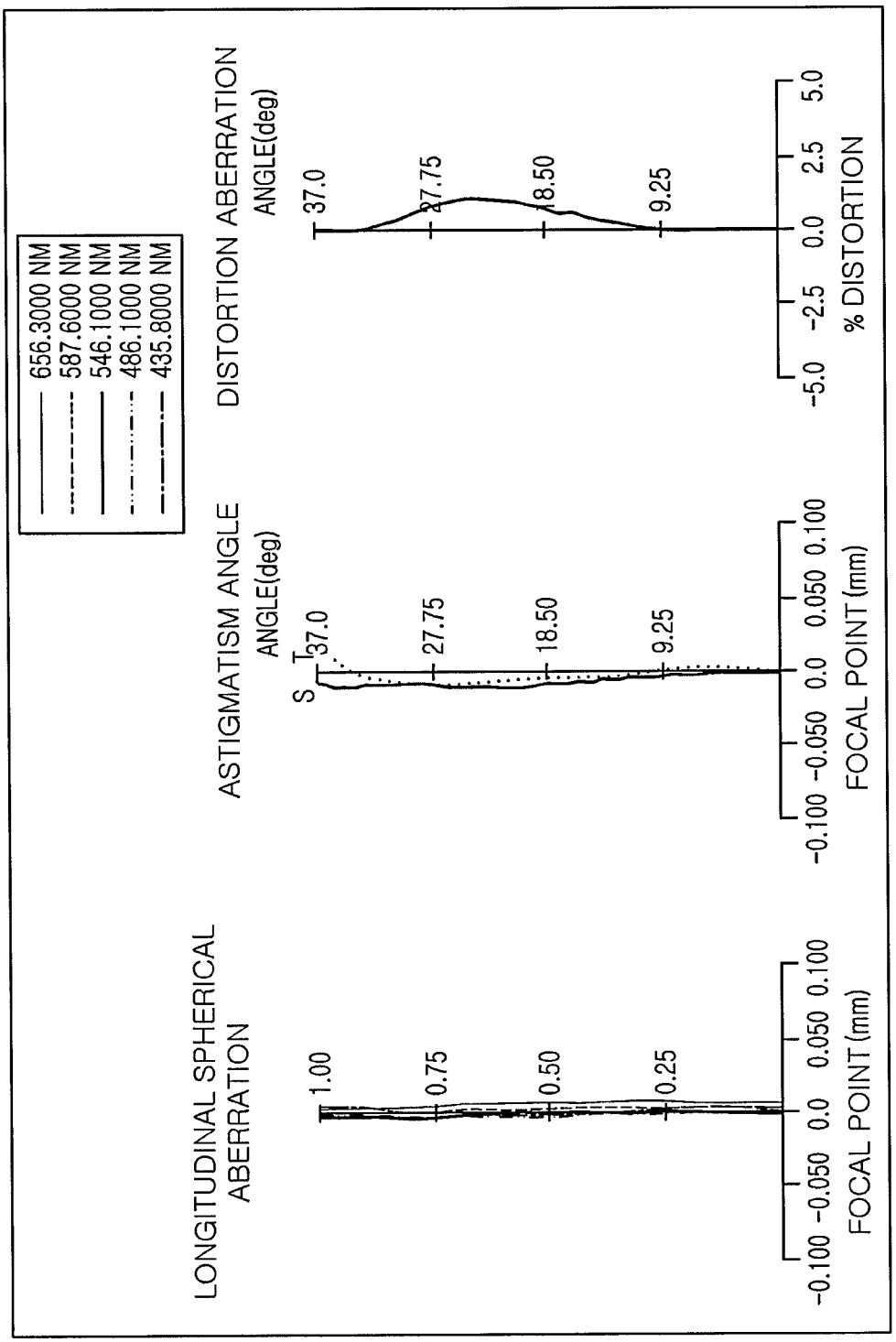
FIGS. 5 and 6 are views illustrating aberration characteristics of the lens module according to the second exemplary embodiment of the present disclosure.
Figure 6:
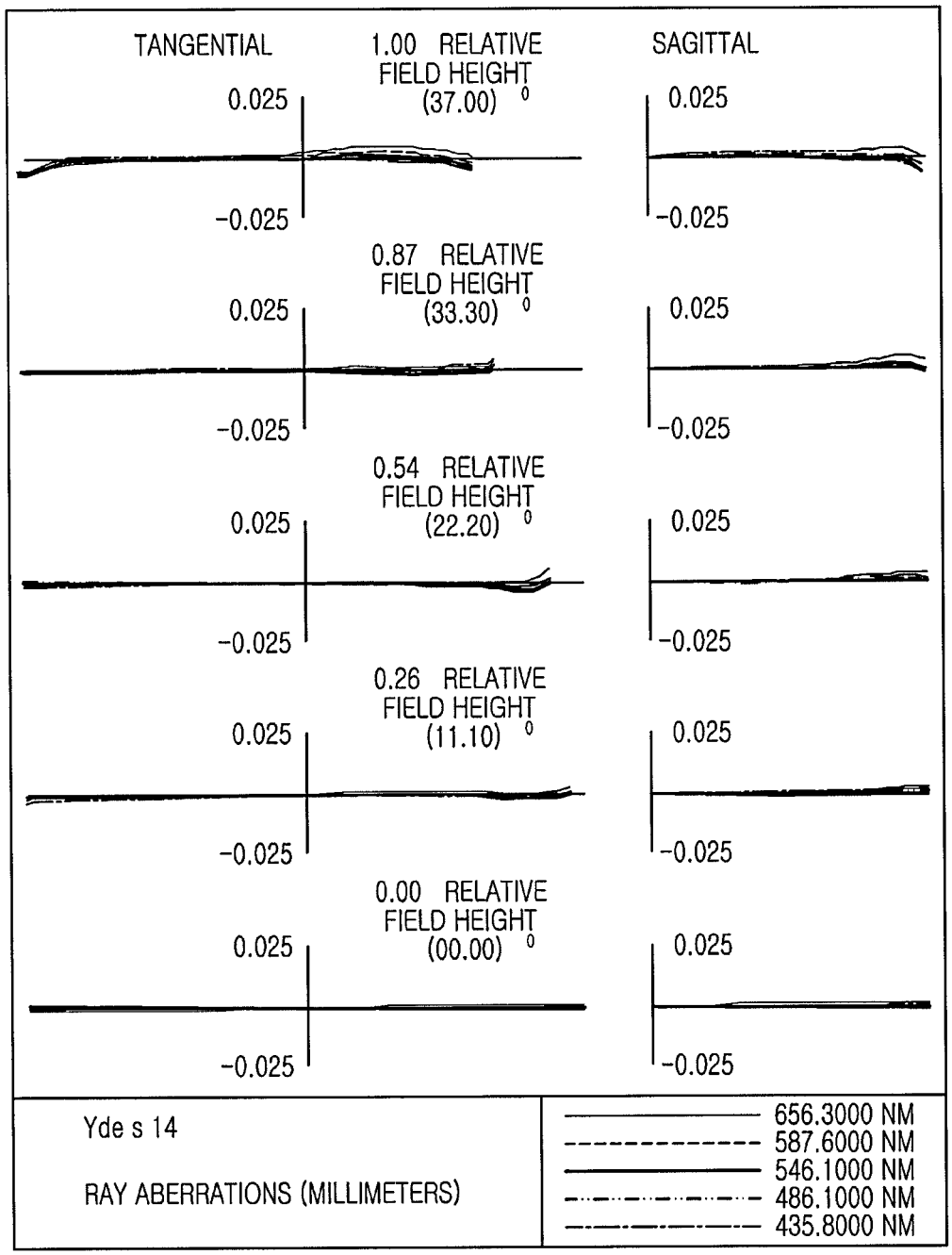

The lens module 200 configured as described above may have the aberration characteristics illustrated in FIGS. 5 and 6.

Table 3 shows lens characteristics (radii of curvature, thicknesses of lenses or distances between lenses, refractive indices, and Abbe numbers) of the lens module 200 according to the second exemplary embodiment of the present disclosure.

TABLE 3

|  | Radius of curvature | Thickness | Refractive index | Abbe number |
|---|---|---|---|---|
| Iris | 2.3763454 | 0.4172945 | 1.5441 | 56.092784 |
| s2 | 11.723743 | 0.0610733 | | |
| s3 | 3.7505828 | 0.4302982 | 1.5441 | 56.092784 |
| s4 | −10.68252 | 0.06 | | |
| s5 | −13.15953 | 0.26661 | 1.6398 | 23.265455 |
| s6 | 3.5543109 | 0.2271491 | | |
| s7 | 10.262393 | 0.5893856 | 1.5441 | 56.092784 |
| s8 | 17.302552 | 0.3592222 | | |
| s9 | −15.8425 | 1.062466 | 1.5441 | 56.092784 |
| s10 | −1.151741 | 0.3911587 | | |
| s11 | −1.932227 | 0.3 | 1.5441 | 56.092784 |
| s12 | 1.916679 | 0.2512909 | | |
| s13 | 1.00E+18 | 0.3 | 1.516798 | 64.1983 |
| s14 | 1.00E+18 | 0.4490224 | | |
| s15 | 1.00E+18 | 0.0009777 | | |

Meanwhile, the surfaces of the first lens 10 to the sixth lens 60 may have the respective aspheric surface coefficients as shown in Table 4. Namely, all of the second surface of the first lens 10 to the second surface of the sixth lens 60 may be aspherical surfaces.

TABLE 4

|  | s1 | s2 | s3 | s4 | s5 | 56 | s7 |
|---|---|---|---|---|---|---|---|
| Conic constant (k) | −0.98186 | 0 | 0 | −16.66245 | −19.99363 | 7.7174902 | 0.1281724 |
| 4-th order coefficient (A) | −0.027924 | −0.148133 | −0.131876797 | 0.0272246 | 0.1075645 | −0.004355 | −0.137339 |

TABLE 4-continued

| | | | | | | | |
|---|---|---|---|---|---|---|---|
| 6-th order coefficient (B) | −0.008283 | 0.1161317 | 0.102680907 | −0.343166 | −0.394035 | −0.086271 | 0.067672 |
| 8-th order coefficient (C) | −0.032799 | 0.1787743 | 0.265372364 | 0.4152628 | 0.5144732 | 0.1693736 | −0.103627 |
| 10-th order coefficient (D) | 0.0474207 | −0.679309 | −0.868078707 | 0.0610638 | 0.0018154 | −0.150636 | 0.2034675 |
| 12-th order coefficient (E) | −0.032084 | 1.0912474 | 1.439603095 | −0.5141 | −0.661344 | 0.1242738 | −0.1439672 |
| 14-th order coefficient (F) | 0.0250994 | −0.863052 | −1.265237811 | 0.2990503 | 0.5546532 | −0.118817 | 0.0823856 |
| 16-th order coefficient (G) | −0.010417 | 0.2753067 | 0.450262661 | | −0.116326 | 0.0491281 | −0.041792 |

| | | s8 | s9 | s10 | s11 | s12 |
|---|---|---|---|---|---|---|
| | Conic constant (k) | −5.100297 | 3.18E−05 | −0.670322 | −1.27453 | −13.17986 |
| | 4-th order coefficient (A) | −0.118438 | −0.095329 | 0.177404 | 0.0819132 | −0.012371 |
| | 6-th order coefficient (B) | 0.0473958 | 0.0019063 | −0.162717 | −0.111764 | −0.01518 |
| | 8-th order coefficient (C) | −0.040839 | −0.019426 | 0.1266634 | 0.0601185 | 0.0095665 |
| | 10-th order coefficient (D) | 0.0173913 | −0.021706 | −0.079561 | −0.018031 | −2.95E−03 |
| | 12-th order coefficient (E) | 0.0358412 | 0.0120994 | 0.0306726 | 3.35E−03 | 4.86E−04 |
| | 14-th order coefficient (F) | −0.022678 | 0.0135485 | −0.005809 | −0.000353 | −4.09E−05 |
| | 16-th order coefficient (G) | 0.0025599 | −0.006587 | 0.0004084 | 1.57E−05 | 1.38E−06 |

Figure 7:
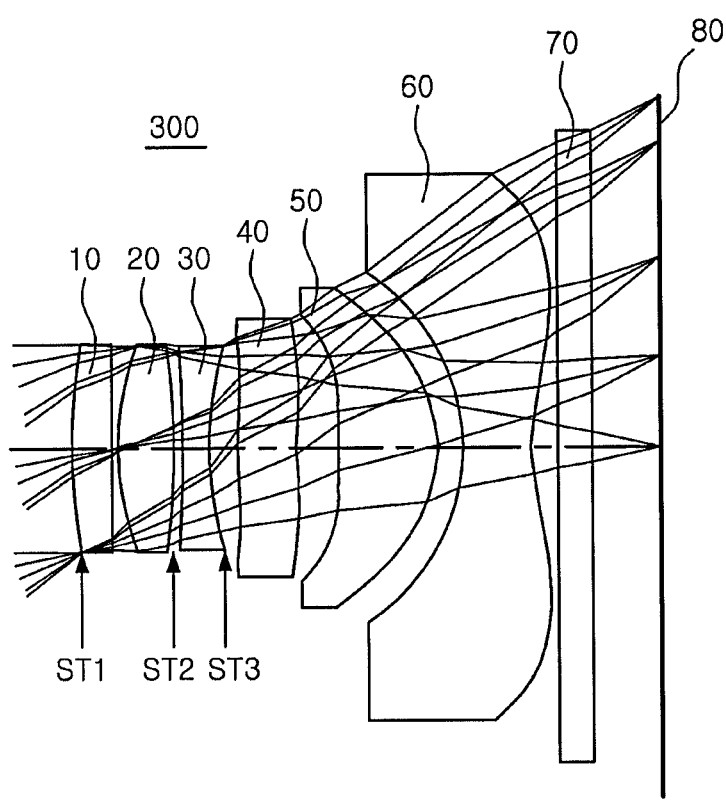
FIG. 7 is a view illustrating a configuration of a lens module according to a third exemplary embodiment of the present disclosure.

A lens module according to a third exemplary embodiment of the present disclosure will be described with reference to FIGS. 7 through 9.

A lens module 300 according to the third exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. Both surfaces of the third lens 30 may be concave.

The fourth lens 40 may have positive refractive power. A first surface of the fourth lens 40 may be convex and a second surface thereof may be concave.

The fifth lens 50 may have positive refractive power. A first surface of the fifth lens 50 may be concave and a second surface thereof may be convex.

The sixth lens 60 may have negative refractive power. Both surfaces of the sixth lens 60 may be concave. Also, the sixth lens 60 may have a point of inflection on a surface thereof. For example, the second surface of the sixth lens 60 may have a point of inflection thereon.

The lens module 300 according to the third exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 300 according to the third exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the third exemplary embodiment of the present disclosure, a total focal length f of the lens module 300 is 4.0 mm, F No. is 2.20, ANG is 74.0, and IMGH is 6.1 mm.

Figure 8:
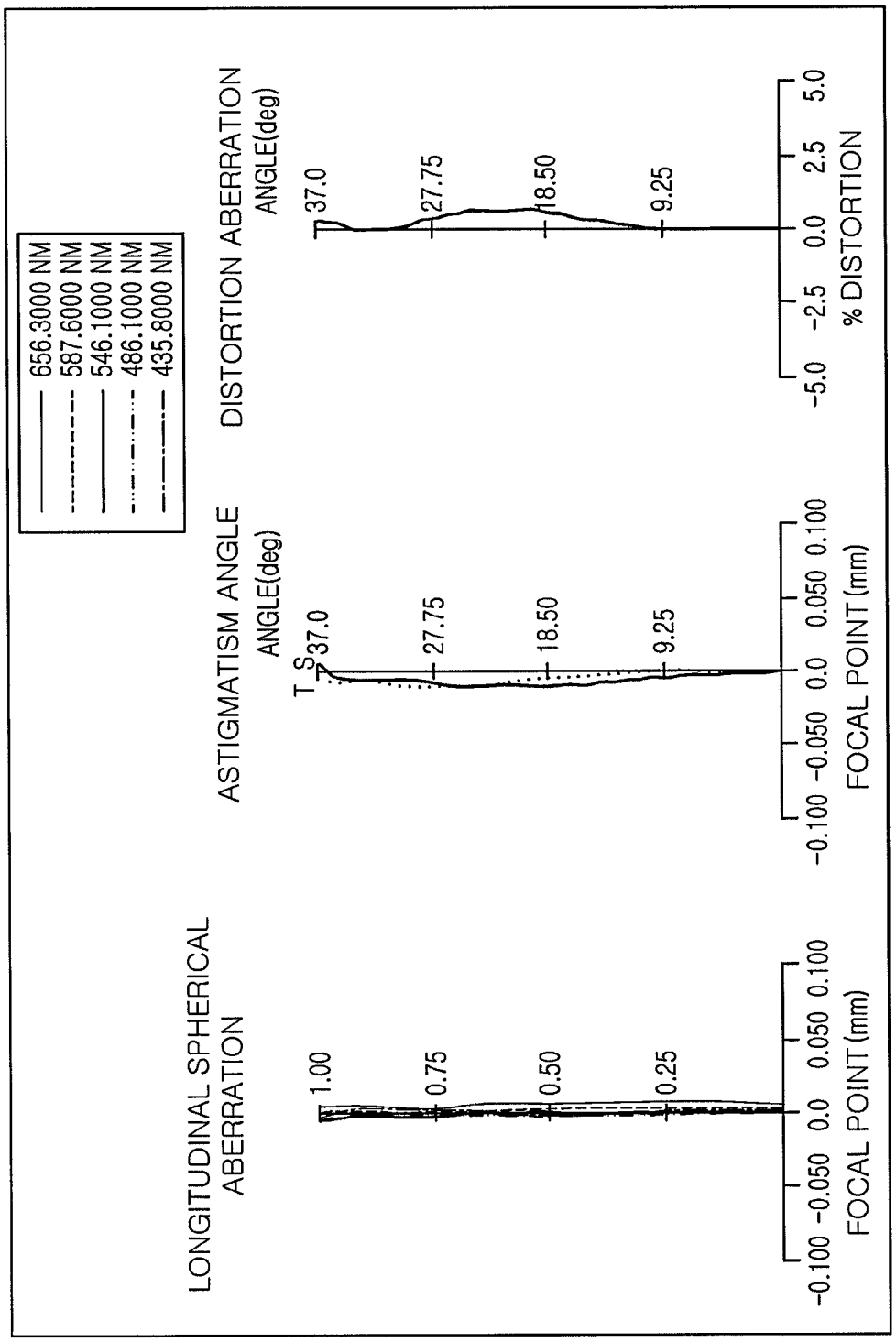
FIGS. 8 and 9 are views illustrating aberration characteristics of the lens module according to the third exemplary embodiment of the present disclosure.
Figure 9:
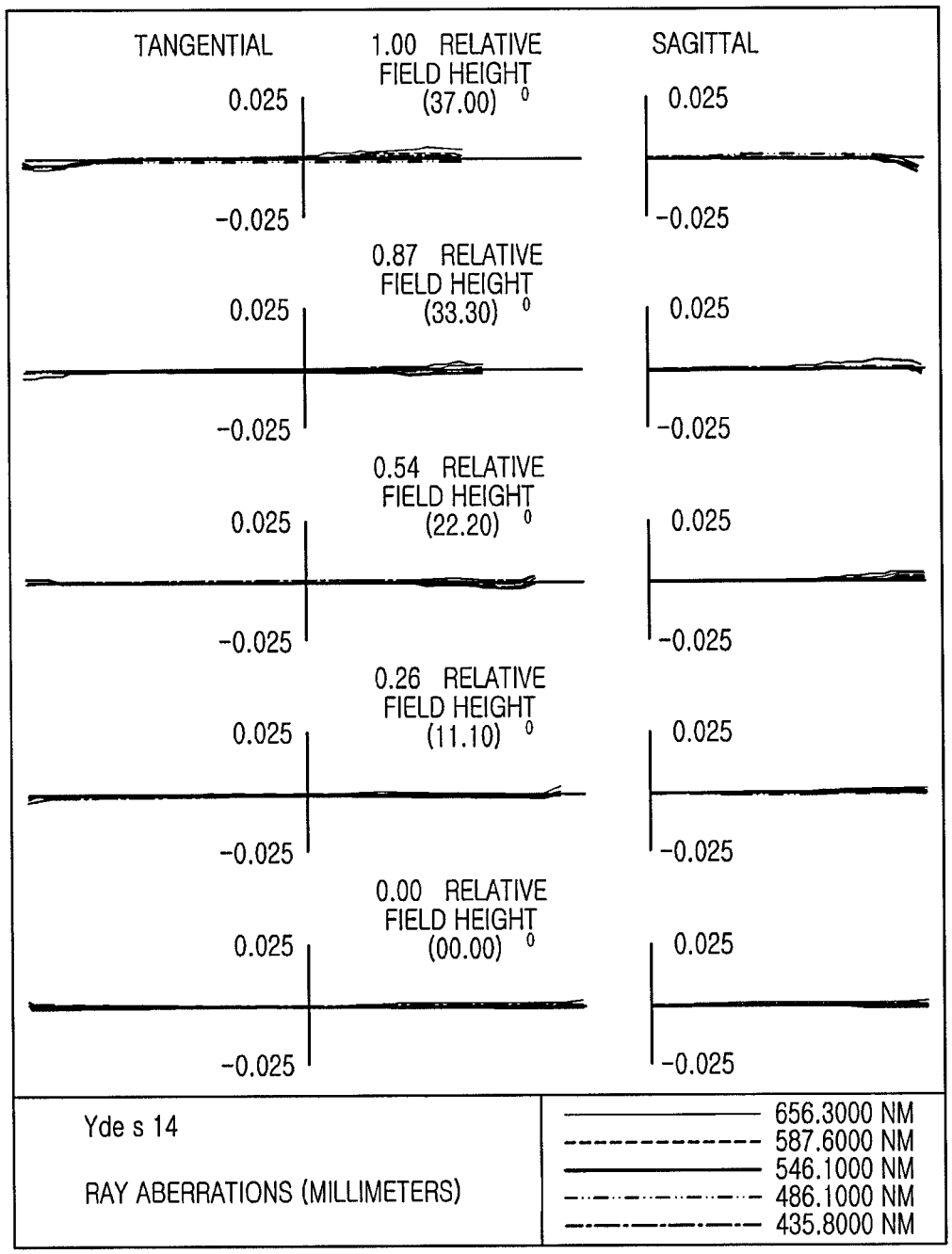

The lens module 300 configured as described above may have the aberration characteristics illustrated in FIGS. 8 and 9.

Table 5 shows lens characteristics (radii of curvature, thicknesses of lenses or distances between lenses, refractive indices, and Abbe numbers) of the lens module 300 according to the third exemplary embodiment of the present disclosure.

TABLE 5

| | Radius of curvature | Thickness | Refractive index | Abbe number |
|---|---|---|---|---|
| Iris | 3.6271694 | 0.3406036 | 1.5441 | 56.092784 |
| s2 | 11.573125 | 0.0611472 | | |
| s3 | 2.3312383 | 0.4855794 | 1.5441 | 56.092784 |
| s4 | −18.95259 | 0.06 | | |

TABLE 5-continued

|  | Radius of curvature | Thickness | Refractive index | Abbe number |
|---|---|---|---|---|
| s5 | −26.27641 | 0.23 | 1.6398 | 23.265455 |
| s6 | 3.3367104 | 0.2518711 | | |
| s7 | 4.5664981 | 0.5132233 | 1.5441 | 56.092784 |
| s8 | 6.1372478 | 0.3708717 | | |
| s9 | −9.552999 | 0.8604013 | 1.5441 | 56.092784 |
| s10 | −0.95039 | 0.2094417 | | |
| s11 | −1.634656 | 0.6 | 1.5441 | 56.092784 |
| s12 | 1.7972528 | 0.2247098 | | |
| s13 | 1.00E+18 | 0.3 | 1.516798 | 64.1983 |
| s14 | 1.00E+18 | 0.5992496 | | |
| s15 | 1.00E+18 | 0.0007501 | | |

Meanwhile, the surfaces of the first lens 10 to the sixth lens 60 may have the respective aspheric surface coefficients as shown in Table 6. Namely, all of the second surface of the first lens 10 to the second surface of the sixth lens 60 may be aspherical surfaces.

TABLE 6

|  | s1 | s2 | s3 | s4 | s5 | s6 | s7 |
|---|---|---|---|---|---|---|---|
| Conic constant (k) | −2.501678 | 0 | 0 | −16.66245 | −19.99363 | 3.3367104 | 0.1281724 |
| 4-th order coefficient (A) | −0.067007 | −0.264843 | −0.214415653 | −0.004632 | 0.0976574 | | −0.189552 |
| 6-th order coefficient (B) | 0.0041361 | 0.5174279 | 0.462761975 | −0.394952 | −0.375596 | | 0.1240214 |
| 8-th order coefficient (C) | −0.020872 | −0.580887 | −0.439991324 | 0.6612856 | 0.498379 | | −0.134141 |
| 10-th order coefficient (D) | 0.1189969 | 0.4546711 | 0.103133874 | −0.330132 | 0.0001082 | | 0.155088 |
| 12-th order coefficient (E) | −0.136111 | −0.121889 | 0.368150094 | −0.12643 | −0.552074 | | −0.065 |
| 14-th order coefficient (F) | 0.0743199 | −0.069467 | −0.46998939 | 0.1401408 | 0.4415529 | | 0.033119 |
| 16-th order coefficient (G) | −0.019832 | 0.0370027 | 0.187549014 | 0 | −0.099052 | | −0.021186 |

|  |  | s8 | s9 | s10 | s11 | s12 |
|---|---|---|---|---|---|---|
| | Conic constant (k) | −5.100297 | 3.18E−05 | −0.75498 | −0.921876 | −13.17986 |
| | 4-th order coefficient (A) | −0.15321 | −0.082804 | 0.3182025 | 0.162146 | −0.027419 |
| | 6-th order coefficient (B) | 0.0639227 | −0.000646 | −0.365341 | −0.265236 | −0.010057 |
| | 8-th order coefficient (C) | −0.111958 | −0.074826 | 0.3295506 | 0.1848654 | 0.0086014 |
| | 10-th order coefficient (D) | 0.1579029 | 0.0400815 | −0.232482 | −0.07524 | −3.06E−03 |
| | 12-th order coefficient (E) | −0.119587 | −0.049991 | 0.1022027 | 1.77E−02 | 5.55E−04 |
| | 14-th order coefficient (F) | 0.0690718 | 0.0604994 | −0.022645 | −0.002146 | −4.98E−05 |
| | 16-th order coefficient (G) | −0.018264 | −0.020093 | 0.0019123 | 1.04E−04 | 1.67E−06 |

Figure 10:
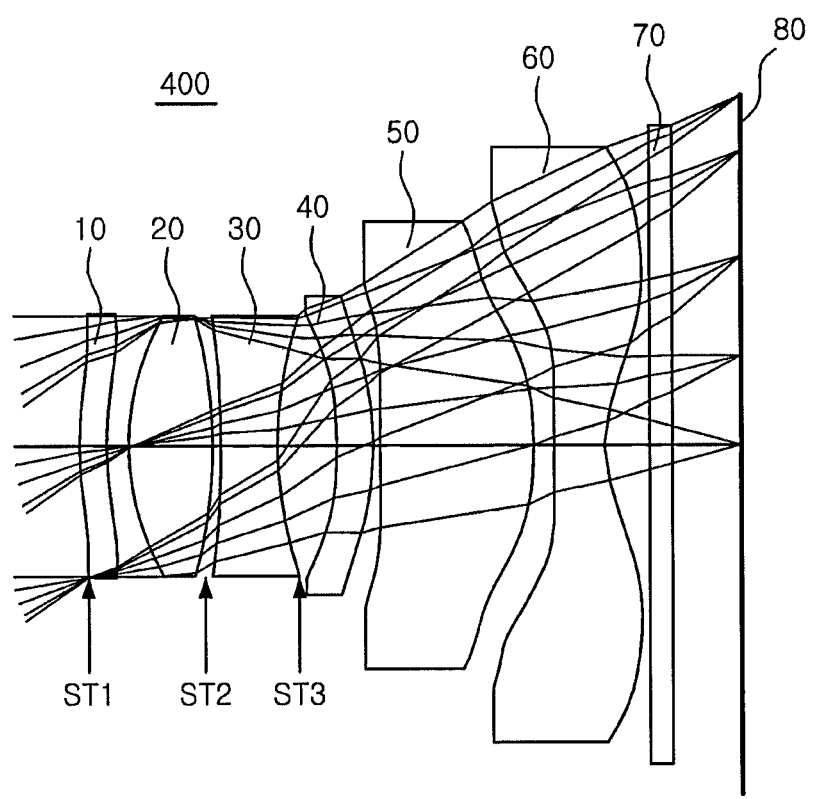
FIG. 10 is a view illustrating a configuration of a lens module according to a fourth exemplary embodiment of the present disclosure.

A lens module according to a fourth exemplary embodiment of the present disclosure will be described with reference to FIGS. 10 through 12.

A lens module 400 according to the fourth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. Also, the first surface of the third lens 30 may be convex and the second surface thereof may be concave.

The fourth lens 40 may have positive refractive power. A first surface of the fourth lens 40 may be concave and a second surface thereof may be convex.

The fifth lens 50 may have positive refractive power. A first surface of the fifth lens 50 may be concave and a second surface thereof may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 400 according to the fourth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 400 according to the fourth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the fourth exemplary embodiment of the present disclosure, a total focal length f of the lens module 400 is 4.4 mm, F No. is 1.90, ANG is 70.0, and IMGH is 6.1 mm.

Figure 11:
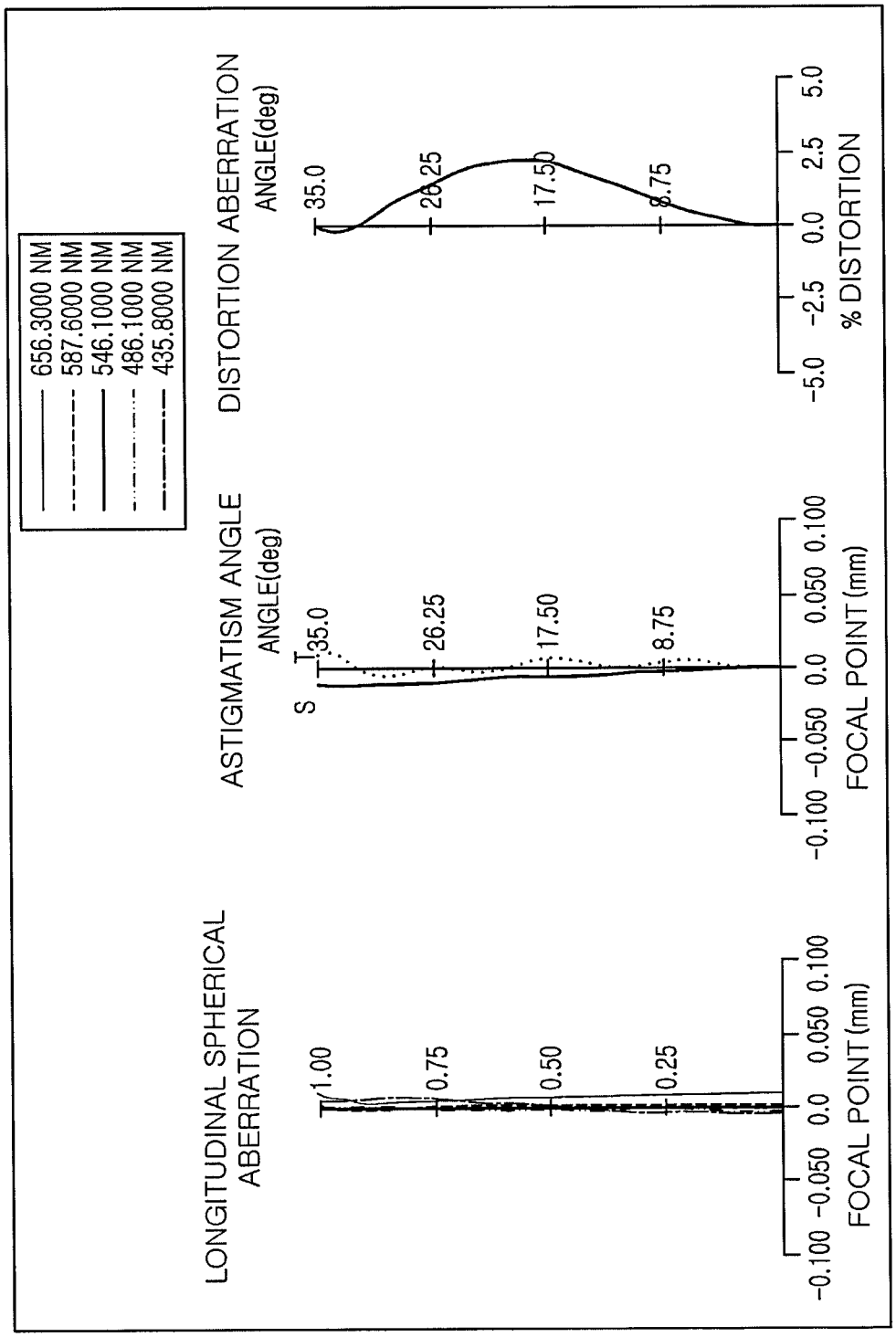
FIGS. 11 and 12 are views illustrating aberration characteristics of the lens module according to the fourth exemplary embodiment of the present disclosure.
Figure 12:
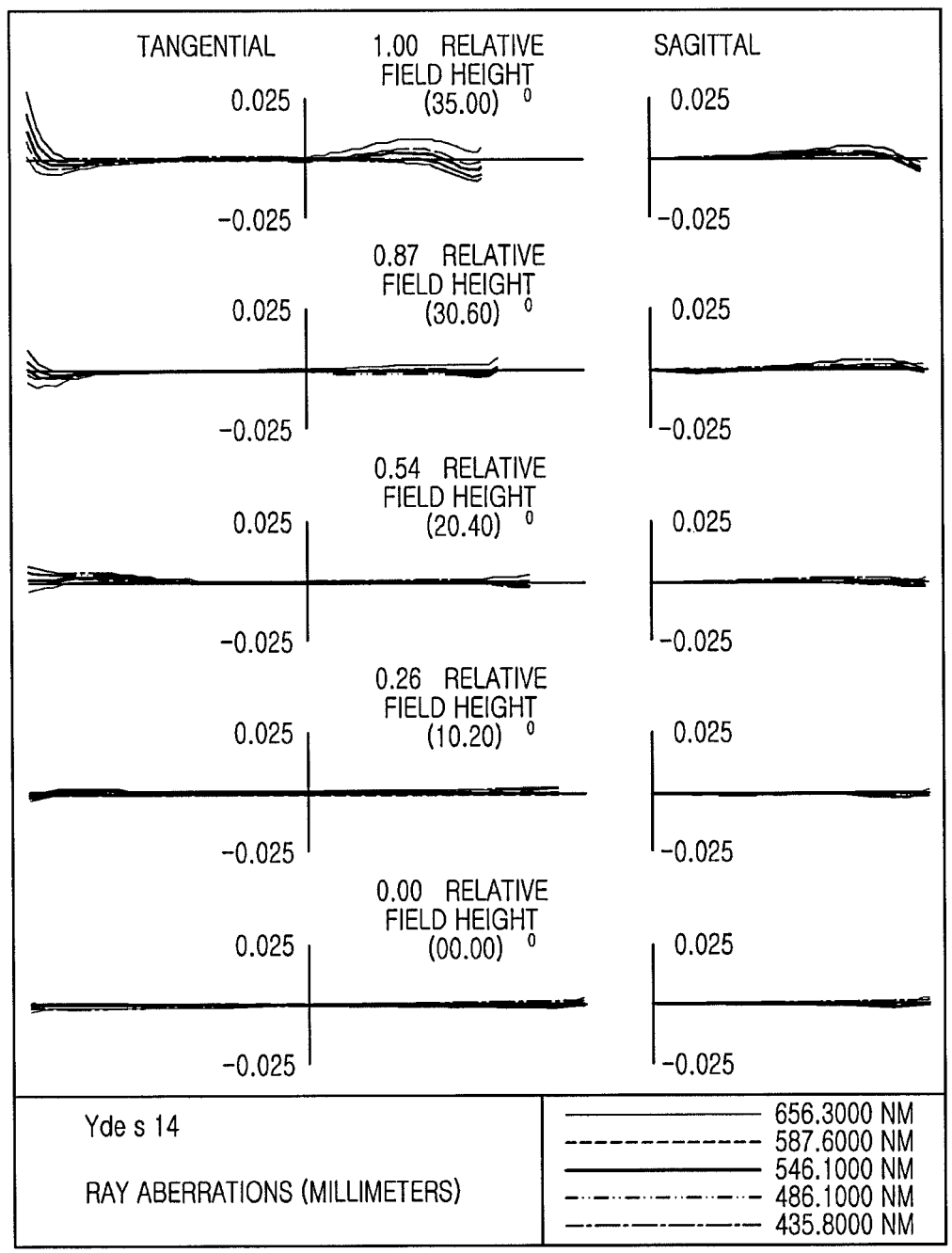

The lens module 400 configured as described above may have the aberration characteristics illustrated in FIGS. 11 and 12.

Table 7 shows lens characteristics (radii of curvature, thicknesses of lenses or distances between lenses, refractive indices, and Abbe numbers) of the lens module 400 according to the fourth exemplary embodiment of the present disclosure.

TABLE 7

|  | Radius of curvature | Thickness | Refractive index | Abbe number |
|---|---|---|---|---|
| Iris | 3.3738934 | 0.2460491 | 1.5441 | 56.092784 |
| s2 | 3.3481227 | 0.1842898 |  |  |
| s3 | 2.1851555 | 0.7418548 | 1.5441 | 56.092784 |
| s4 | −4.643173 | 0.06 |  |  |
| s5 | 2462.0548 | 0.4824786 | 1.6398 | 23.265455 |
| s6 | 3.3036764 | 0.5400216 |  |  |
| s7 | −3.093739 | 0.3227351 | 1.5441 | 56.092784 |
| s8 | −2.946418 | 0.06 |  |  |
| s9 | −29.15744 | 1.3649623 | 1.5441 | 56.092784 |
| s10 | −1.737164 | 0.1681944 |  |  |
| s11 | 6.1251122 | 0.4523248 | 1.5441 | 56.092784 |
| s12 | 1.0757316 | 0.3742997 |  |  |
| s13 | 1.00E+18 | 0.21 | 1.516798 | 64.1983 |
| s14 | 1.00E+18 | 0.5991872 |  |  |
| s15 | 1.00E+18 | 0.0008322 |  |  |

Meanwhile, the surfaces of the first lens 10 to the sixth lens 60 may have the respective aspheric surface coefficients as shown in Table 8. Namely, all of the second surface of the first lens 10 to the second surface of the sixth lens 60 may be aspherical surfaces.

TABLE 8

|  | s1 | s2 | s3 | s4 | s5 | s6 | s7 |
|---|---|---|---|---|---|---|---|
| Conic constant (k) | −1.275132 | 1.378657 | −1.797348641 | 0.187497 | 3.8991602 | −3.481327 | 3.423156 |
| 4-th order coefficient (A) | −0.05798 | −0.074468 | 0.013192489 | −0.00283 | −0.044413 | −0.019371 | −0.017336 |
| 6-th order coefficient (B) | −0.003746 | 0.0061587 | 0.007869926 | −0.014525 | −0.008592 | 0.0045642 | −0.017063 |
| 8-th order coefficient (C) |  |  | −0.002577366 | 0.0117972 | 0.0167147 | 0.0036349 | 0.0277101 |
| 10-th order coefficient (D) |  |  | −0.00032712 | −0.002655 | 0.0015608 | 0.0031591 | −0.01251 |
| 12-th order coefficient (E) |  |  |  |  | −0.002213 | 0.0009848 | 0.0080185 |
| 14-th order coefficient (F) |  |  |  |  |  |  |  |
| 16-th order coefficient (G) |  |  |  |  |  |  |  |
| 18-th order coefficient (H) |  |  |  |  |  |  |  |
| 20-th order coefficient (I) |  |  |  |  |  |  |  |

|  | s8 | s9 | s10 | s11 | s12 |
|---|---|---|---|---|---|
| Conic constant (k) | −6.949861 | −3.00E+00 | −0.409391 | −1 | −3.974636 |
| 4-th order coefficient (A) | −0.003601 | 0.063503 | 0.1804254 | −0.154707 | −0.117731 |
| 6-th order coefficient (B) | −0.166367 | −0.179742 | −0.209525 | −0.012321 | 0.0583226 |
| 8-th order coefficient (C) | 0.2443595 | 0.2058802 | 0.1746344 | 0.0290939 | −0.023069 |
| 10-th order coefficient (D) | −0.184252 | −0.135798 | −0.102677 | −0.006866 | 6.69E−03 |
| 12-th order coefficient (E) | 0.0947509 | 0.0530026 | 0.0425092 | 4.93E−04 | −1.29E−03 |
| 14-th order coefficient (F) | −0.031554 | −0.011354 | −0.010801 |  | 1.43E−04 |
| 16-th order coefficient (G) | 0.0051005 | 0.0008478 | 0.0014296 |  | −6.43E−06 |
| 18-th order coefficient (H) |  |  | −6.61E−05 |  | −1.76E−07 |
| 20-th order coefficient (I) |  |  | −1.59E−06 |  |  |

Figure 13:
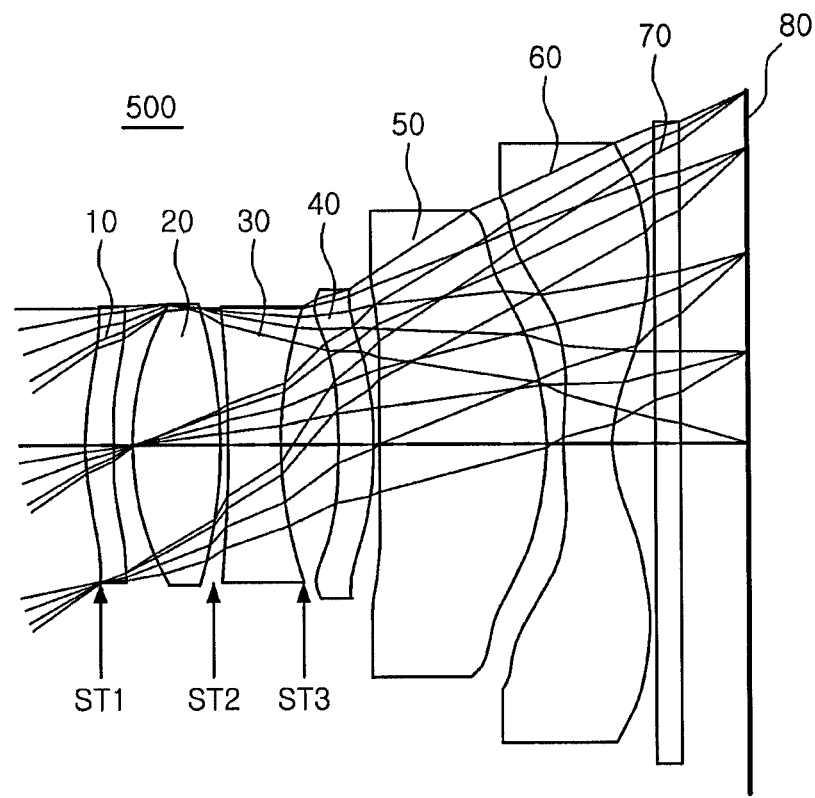
FIG. 13 is a view illustrating a configuration of a lens module according to a fifth exemplary embodiment of the present disclosure.

A lens module according to a fifth exemplary embodiment of the present disclosure will be described with reference to FIGS. 13 through 15.

A lens module 500 according to the fifth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. A first surface of the third lens 30 may be convex and a second surface thereof may be concave.

The fourth lens 40 may have positive refractive power. A first surface of the fourth lens 40 may be concave and a second surface thereof may be convex.

The fifth lens 50 may have positive refractive power. Both surfaces of the fifth lens 50 may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 500 according to the fifth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 500 according to the fifth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the fifth exemplary embodiment of the present disclosure, a total focal length f of the lens module 500 is 4.4 mm, F No. is 1.80, ANG is 70.0, and IMGH is 6.1 mm.

Figure 14:
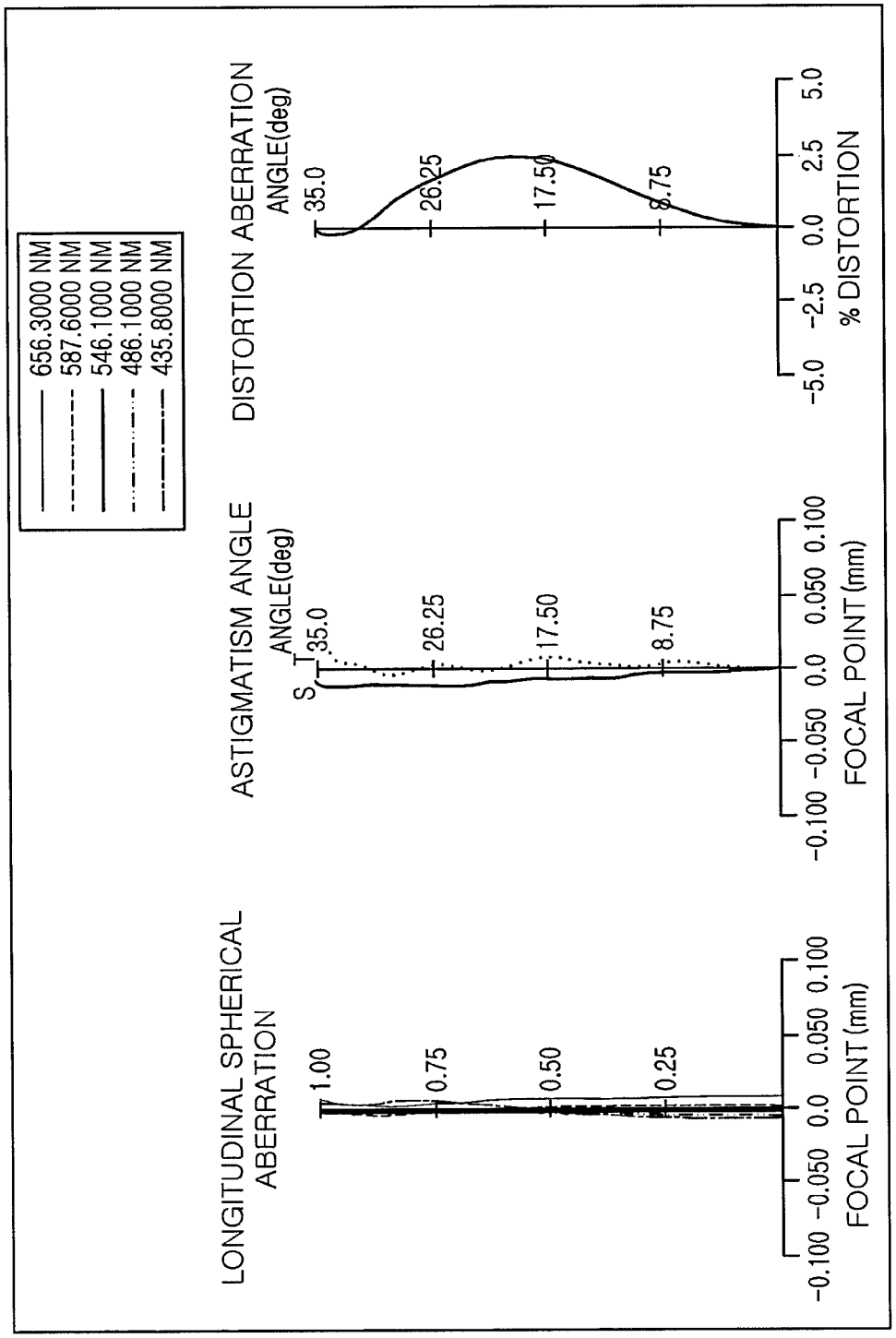
FIGS. 14 and 15 are views illustrating aberration characteristics of the lens module according to the fifth exemplary embodiment of the present disclosure.
Figure 15:
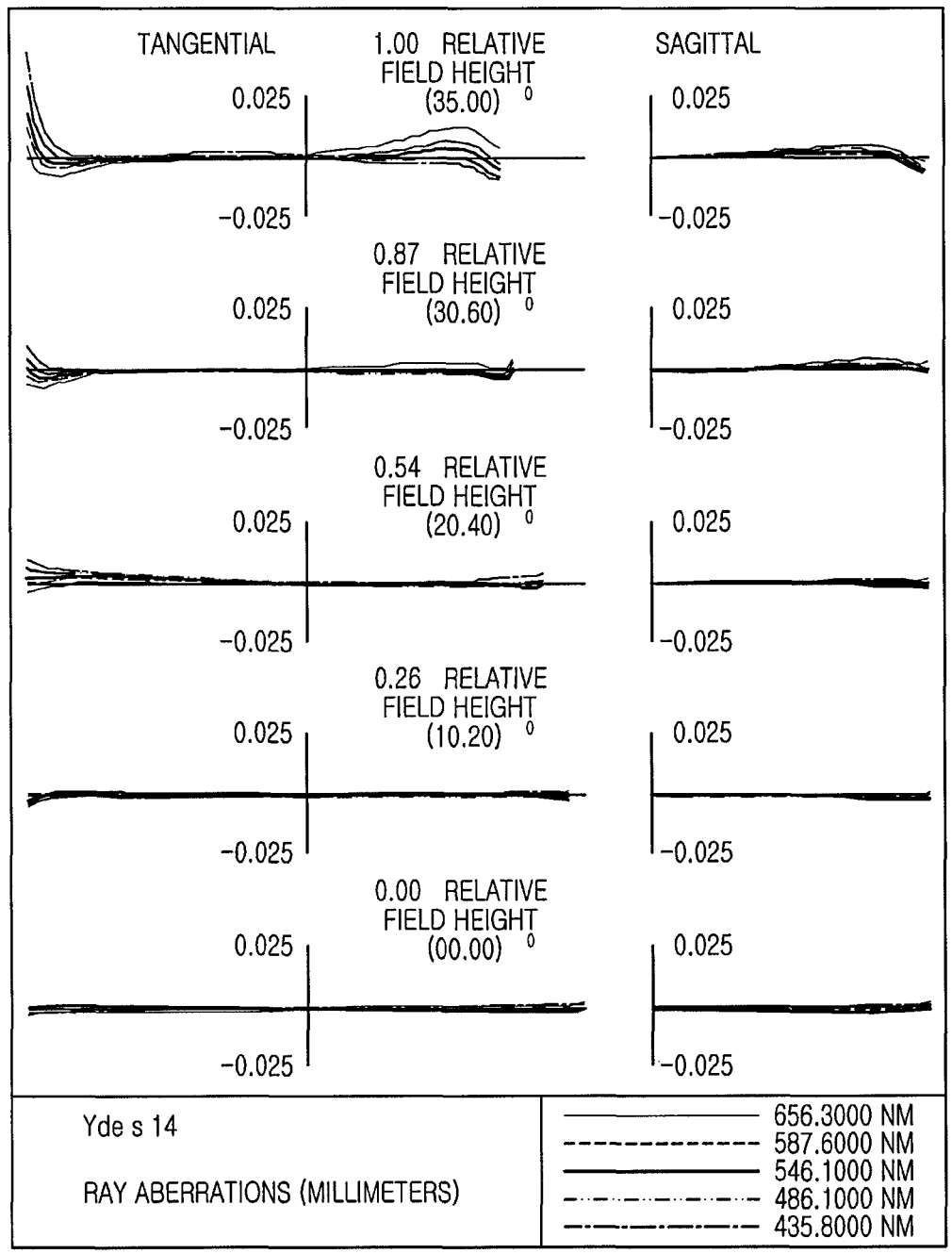

The lens module 500 configured as described above may have the aberration characteristics illustrated in FIGS. 14 and 15.

Table 9 shows lens characteristics (radii of curvature, thicknesses of lenses or distances between lenses, refractive indices, and Abbe numbers) of the lens module 500 according to the fifth exemplary embodiment of the present disclosure.

TABLE 9

|  | Radius of curvature | Thickness | Refractive index | Abbe number |
| --- | --- | --- | --- | --- |
| Iris | 2.8637138 | 0.23 | 1.5441 | 56.092784 |
| s2 | 2.877446 | 0.1694916 |  |  |
| s3 | 2.215542 | 0.7797962 | 1.5441 | 56.092784 |
| s4 | −5.170679 | 0.06 |  |  |
| s5 | 67.433425 | 0.4654258 | 1.632 | 23.407407 |
| s6 | 3.184439 | 0.5111926 |  |  |
| s7 | −3.740586 | 0.302775 | 1.5441 | 56.092784 |
| s8 | −3.562462 | 0.06 |  |  |
| s9 | 1197.4801 | 1.4681611 | 1.5441 | 56.092784 |
| s10 | −1.76099 | 0.1504279 |  |  |
| s11 | 4.5897101 | 0.4257628 | 1.5441 | 56.092784 |
| s12 | 1.0176819 | 0.3859835 |  |  |
| s13 | 1.00E+18 | 0.21 | 1.516798 | 64.1983 |
| s14 | 1.00E+18 | 0.5992088 |  |  |
| s15 | 1.00E+18 | 0.0007647 |  |  |

Meanwhile, the surfaces of the first lens 10 to the sixth lens 60 may have the respective aspheric surface coefficients as shown in Table 10. Namely, all of the second surface of the first lens 10 to the second surface of the sixth lens 60 may be aspherical surfaces.

TABLE 10

|  | s1 | s2 | s3 | s4 | s5 | s6 | s7 |
| --- | --- | --- | --- | --- | --- | --- | --- |
| Conic constant (k) | 2.8637138 | −1.581197 | −2.005219055 | 1.1174162 | 3.8991602 | −4.653247 | 3.7945214 |
| 4-th order coefficient (A) | −1.103261 | −0.076873 | 0.008428997 | −0.000746 | −0.044985 | −0.02057 | −0.019625 |
| 6-th order coefficient (B) | −0.055873 | 0.0068724 | 0.008076355 | −0.020457 | −0.012649 | 0.0036941 | −0.030528 |
| 8-th order coefficient (C) | −0.004575 |  | −0.001555702 | 0.0137992 | 0.0185321 | 0.0031247 | 0.0506201 |
| 10-th order coefficient (D) |  |  | −0.000784321 | −0.00294 | 0.0004963 | 0.0025303 | −0.024504 |
| 12-th order coefficient (E) |  |  |  |  | −0.001707 | 0.0012599 | 0.0086137 |
| 14-th order coefficient (F) |  |  |  |  |  |  |  |
| 16-th order coefficient (G) |  |  |  |  |  |  |  |
| 18-th order coefficient (H) |  |  |  |  |  |  |  |

TABLE 10-continued

|  | s8 | s9 | s10 | s11 | s12 |
|---|---|---|---|---|---|
| Conic constant (k) | −13.43453 | −3.00E+00 | −0.416597 | −1 | −3.820054 |
| 4-th order coefficient (A) | 0.007927 | 0.07491303 | 0.1919086 | −0.173202 | −0.124615 |
| 6-th order coefficient (B) | −0.219395 | −0.22439908 | −0.232184 | −0.002696 | 0.0635906 |
| 8-th order coefficient (C) | 0.3553648 | 0.29035207 | 0.2009583 | 0.0245903 | −0.025596 |
| 10-th order coefficient (D) | −0.291551 | −0.21758726 | −0.122647 | −0.005765 | 7.44E−03 |
| 12-th order coefficient (E) | 0.1558382 | 0.09828589 | 0.0526059 | 3.96E−04 | −1.41E−03 |
| 14-th order coefficient (F) | −0.051224 | −0.02507027 | −0.014356 |  | 1.53E−04 |
| 16-th order coefficient (G) | 0.0078261 | 0.00267779 | 0.0022741 |  | −6.40E−06 |
| 18-th order coefficient (H) |  |  | −1.84E−04 |  |  |

Figure 16:
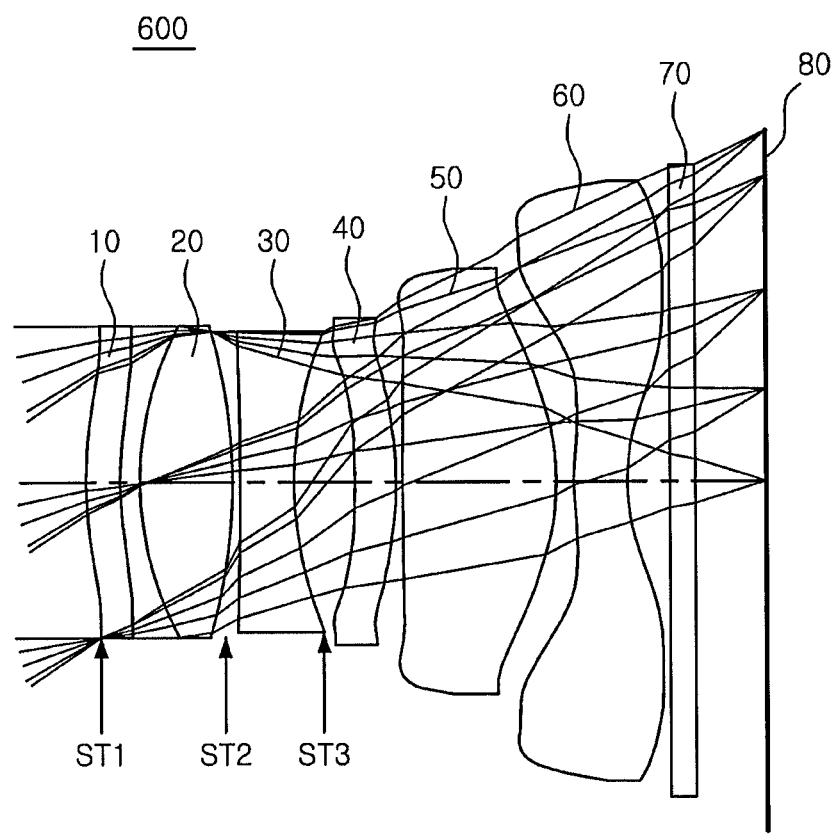
FIG. 16 is a view illustrating a configuration of a lens module according to a sixth exemplary embodiment of the present disclosure.

A lens module according to a sixth exemplary embodiment of the present disclosure will be described with reference to FIGS. 16 through 18.

A lens module 600 according to the sixth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. A first surface of the third lens 30 may be convex and a second surface thereof may be concave.

The fourth lens 40 may have positive refractive power. A first surface of the fourth lens 40 may be concave and a second surface thereof may be convex.

The fifth lens 50 may have positive refractive power. Both surfaces of the fifth lens 50 may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 600 according to the sixth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 600 according to the sixth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the sixth exemplary embodiment of the present disclosure, a total focal length f of the lens module 600 is 4.2 mm, F No. is 1.60, ANG is 70.0, and IMGH is 6.1 mm.

Figure 17:
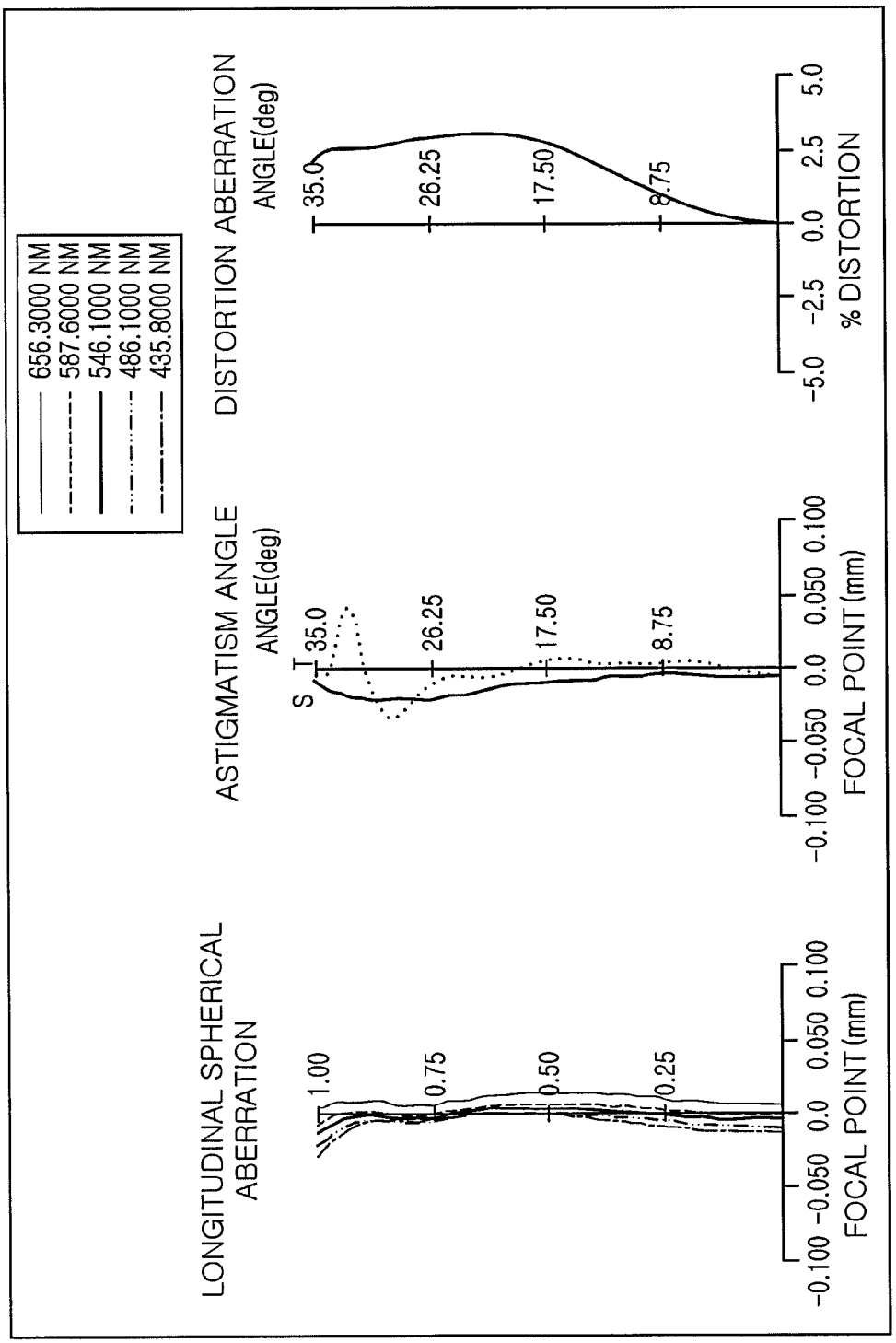
FIGS. 17 and 18 are views illustrating aberration characteristics of the lens module according to the sixth exemplary embodiment of the present disclosure.
Figure 18:
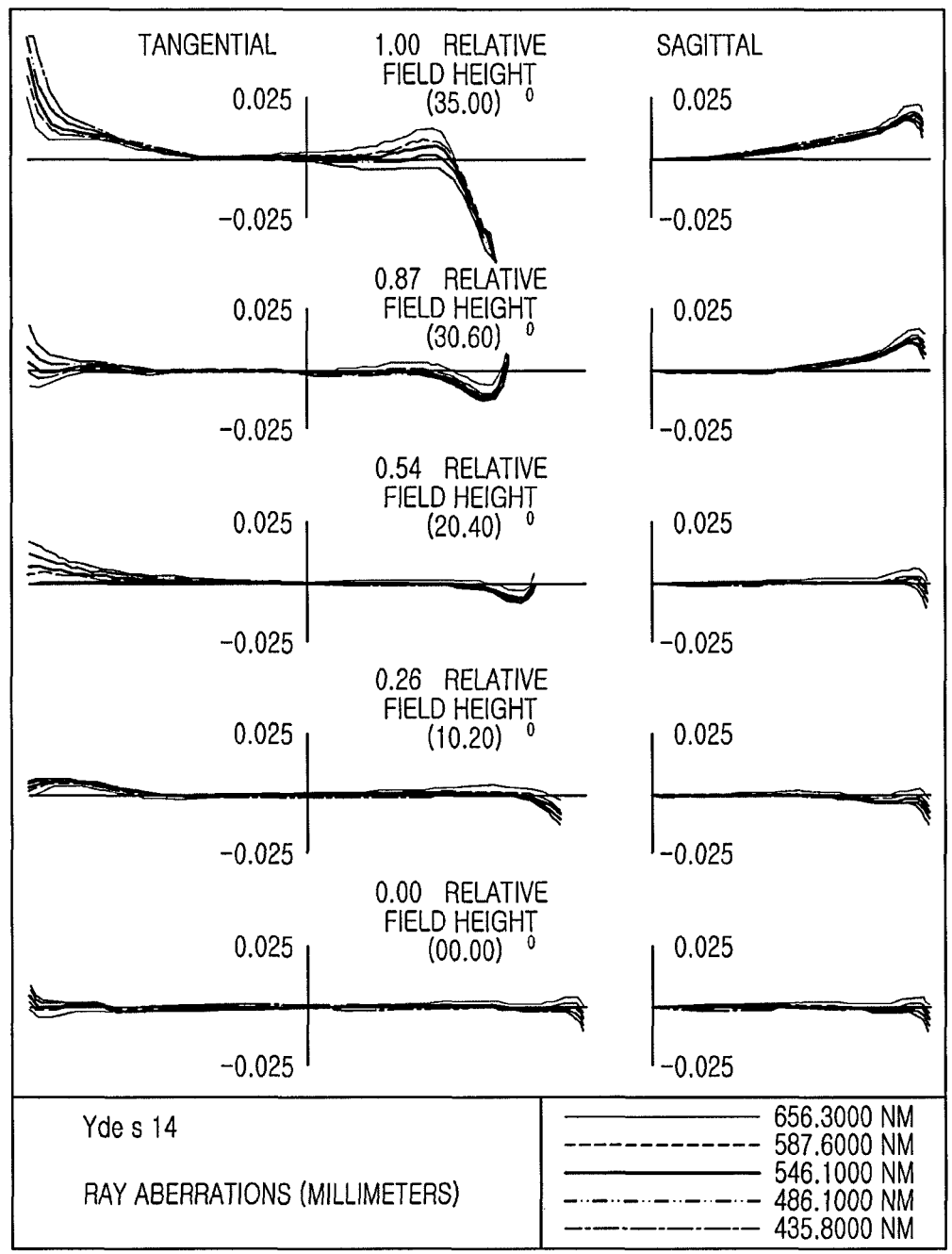

The lens module 600 configured as described above may have the aberration characteristics illustrated in FIGS. 17 and 18.

Table 11 shows lens characteristics (radii of curvature, thicknesses of lenses or distances between lenses, refractive indices, and Abbe numbers) of the lens module 600 according to the sixth exemplary embodiment of the present disclosure.

TABLE 11

|  | Radius of curvature | Thickness | Refractive index | Abbe number |
|---|---|---|---|---|
| Iris | 3.2478199 | 0.290149 | 1.5441 | 56.092784 |
| s2 | 3.2698931 | 0.1585451 |  |  |
| s3 | 2.2165183 | 0.7868545 | 1.5441 | 56.092784 |
| s4 | −5.494556 | 0.06 |  |  |
| s5 | 52.030137 | 0.4721386 | 1.632 | 23.407407 |
| s6 | 3.2531212 | 0.5090575 |  |  |
| s7 | −4.385596 | 0.33924 | 1.5441 | 56.092784 |
| s8 | −4.145789 | 0.06 |  |  |
| s9 | 373.33927 | 1.2997087 | 1.5441 | 56.092784 |
| s10 | −1.762792 | 0.1570957 |  |  |
| s11 | 3.814853 | 0.4270909 | 1.5441 | 56.092784 |
| s12 | 0.9875895 | 0.3860597 |  |  |
| s13 | 1.00E+18 | 0.21 | 1.516798 | 64.1983 |
| s14 | 1.00E+18 | 0.5952719 |  |  |
| s15 | 1.00E+18 | 0.0047281 |  |  |

Meanwhile, the surfaces of the first lens 10 to the sixth lens 60 may have the respective aspheric surface coefficients as shown in Table 12. Namely, all of the second surface of the first lens 10 to the second surface of the sixth lens 60 may be aspherical surfaces.

TABLE 12

| | s1 | s2 | s3 | s4 | s5 | s6 | s7 |
|---|---|---|---|---|---|---|---|
| Conic constant (k) | 0.464213 | −0.580711 | −2.421383416 | 0.0294996 | 20 | −3.625614 | 4.457386 |
| 4-th order coefficient (A) | −0.047601 | −0.074744 | 0.000498991 | 0.0019328 | −0.030023 | −0.016099 | −0.029212 |
| 6-th order coefficient (B) | −0.002833 | 0.0100347 | 0.005602393 | −0.026044 | −0.012947 | 0.0033711 | −0.019112 |
| 8-th order coefficient (C) | | | −0.002007172 | 0.0166753 | 0.0211766 | 0.006945 | 0.0406475 |
| 10-th order coefficient (D) | | | −0.000595655 | −0.003913 | −0.002587 | 0.0012357 | −0.015843 |
| 12-th order coefficient (E) | | | | | −0.001084 | −0.000268 | 0.0046426 |
| 14-th order coefficient (F) | | | | | | | |
| 16-th order coefficient (G) | | | | | | | |
| 18-th order coefficient (H) | | | | | | | |

| | s8 | s9 | s10 | s11 | s12 |
|---|---|---|---|---|---|
| Conic constant (k) | −17.81684 | −3.00E+00 | −0.438153 | −2.525266 | −3.550602 |
| 4-th order coefficient (A) | 0.0042936 | 0.07617537 | 0.1891787 | −0.187465 | −0.141457 |
| 6-th order coefficient (B) | −0.191567 | −0.19739475 | −0.242293 | −0.009081 | 0.0763676 |
| 8-th order coefficient (C) | 0.3073869 | 0.23642422 | 0.2228083 | 0.0318733 | −0.032663 |
| 10-th order coefficient (D) | −0.243065 | −0.16673441 | −0.147517 | −0.007597 | 1.03E−02 |
| 12-th order coefficient (E) | 0.1243776 | 0.07350797 | 0.0687768 | 5.50E−04 | −2.12E−03 |
| 14-th order coefficient (F) | −0.039595 | −0.01906693 | −0.020291 | | 2.54E−04 |
| 16-th order coefficient (G) | 0.0059804 | 0.00217833 | 0.0035029 | | −1.35E−05 |
| 18-th order coefficient (H) | | | −3.19E−04 | | −1.39E−07 |

Figure 19:
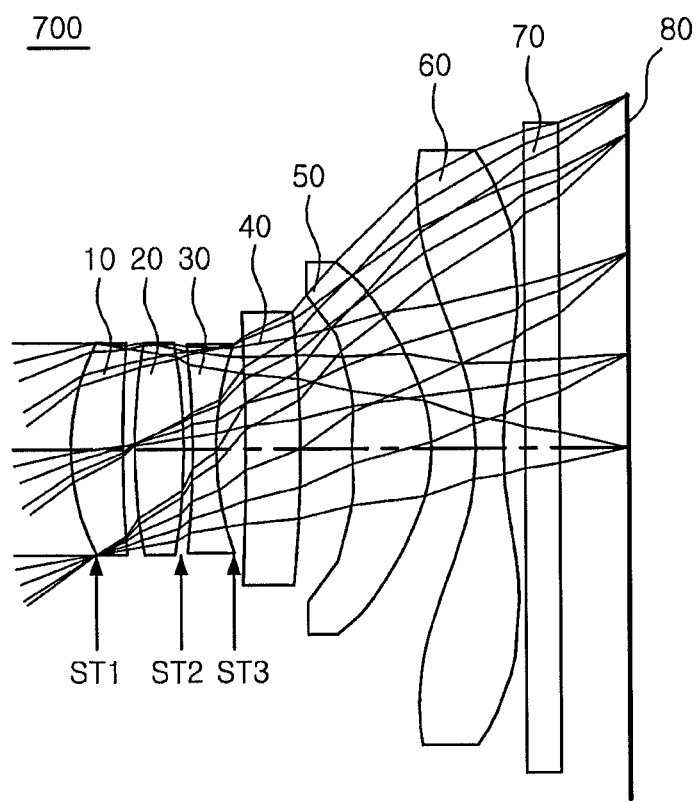
FIG. 19 is a view illustrating a configuration of a lens module according to a seventh exemplary embodiment of the present disclosure.

A lens module according to a seventh exemplary embodiment of the present disclosure will be described with reference to FIGS. 19 through 21.

A lens module 700 according to the seventh exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. Both surfaces of the third lens 30 may be concave.

The fourth lens 40 may have positive refractive power. Both surfaces of the fourth lens 40 may be convex.

The fifth lens 50 may have positive refractive power. A first surface of the fifth lens 50 may be concave and a second surface thereof may be convex.

The sixth lens 60 may have negative refractive power. Both surfaces of the sixth lens 60 may be convex. Also, the sixth lens 60 may have a point of inflection on a surface thereof. For example, the second surface of the sixth lens 60 may have a point of inflection thereon.

The lens module 700 according to the seventh exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 700 according to the seventh exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the seventh exemplary embodiment of the present disclosure, a total focal length f of the lens module 700 is 4.0 mm, F No. is 2.20, ANG is 73.0, and IMGH is 6.1 mm.

Figure 20:
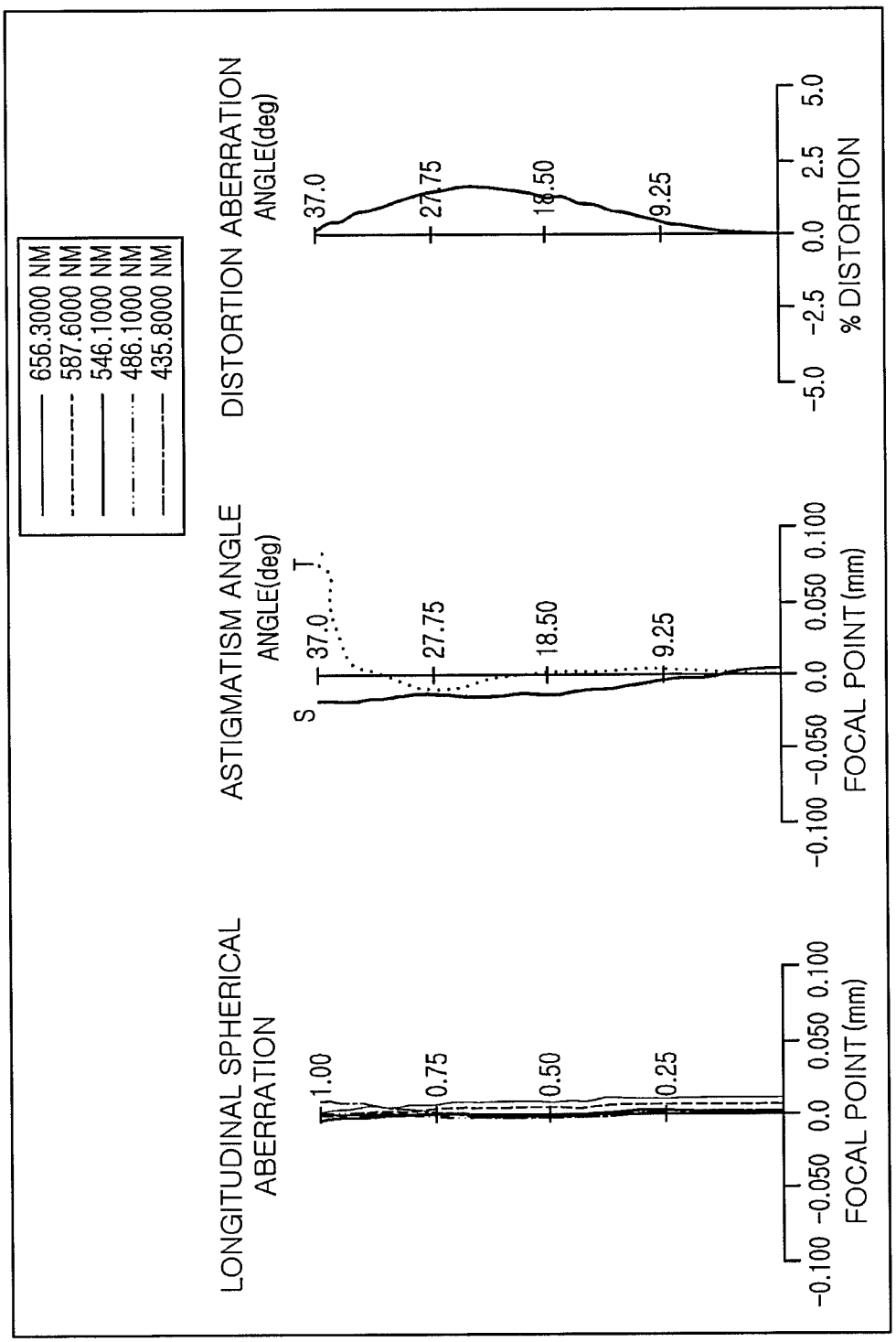
FIGS. 20 and 21 are views illustrating aberration characteristics of the lens module according to the seventh exemplary embodiment of the present disclosure.
Figure 21:
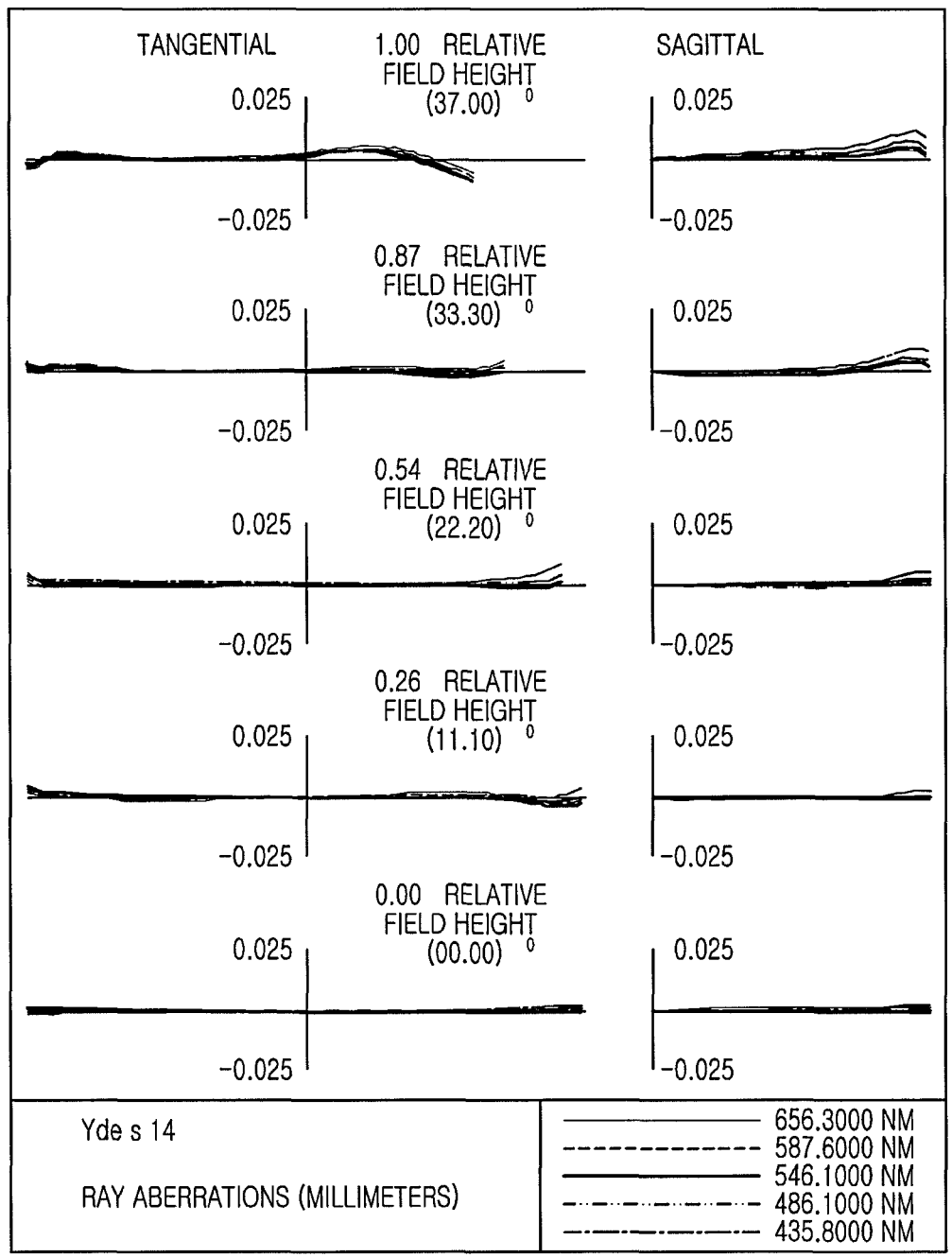

The lens module 700 configured as described above may have the aberration characteristics illustrated in FIGS. 20 and 21.

Table 13 shows lens characteristics (radii of curvature, thicknesses of lenses or distances between lenses, refractive indices, and Abbe numbers) of the lens module 700 according to the seventh exemplary embodiment of the present disclosure.

TABLE 13

|  | Radius of curvature | Thickness | Refractive index | Abbe number |
|---|---|---|---|---|
| Iris | 1.76745 | 0.45173 | 1.5441 | 56.0928 |
| s2 | 5.76546 | 0.09506 | | |
| s3 | 4.39902 | 0.41244 | 1.5441 | 56.0928 |
| s4 | −6.4931 | 0.08387 | | |
| s5 | −6.7886 | 0.207 | 1.6398 | 23.2655 |
| s6 | 3.31886 | 0.23366 | | |
| s7 | 15.5437 | 0.47857 | 1.6398 | 23.2655 |
| s8 | −34.971 | 0.44432 | | |
| s9 | −16.415 | 0.66333 | 1.5441 | 56.0928 |
| s10 | −1.4301 | 0.38464 | | |
| s11 | −1.9804 | 0.23 | 1.5441 | 56.0928 |
| s12 | 2.87146 | 0.18161 | | |
| s13 | 1.00E+18 | 0.3 | 1.5168 | 64.1983 |
| s14 | 1.00E+18 | 0.59217 | | |
| s15 | 1.00E+18 | −0.0022 | | |

Meanwhile, the surfaces of the first lens 10 to the sixth lens 60 may have the respective aspheric surface coefficients as shown in Table 14. Namely, all of the second surface of the first lens 10 to the second surface of the sixth lens 60 may be aspherical surfaces.

TABLE 14

|  | s1 | s2 | s3 | s4 | s5 | s6 | s7 |
|---|---|---|---|---|---|---|---|
| Conic constant (k) | −0.5407 | 0 | 0 | −14.818 | −20 | 3.31886 | 0 |
| 4-th order coefficient (A) | −0.0187 | −0.1398 | −0.1411 | 0.02798 | 0.15203 | | −0.078 |
| 6-th order coefficient (B) | −0.0041 | 0.11729 | 0.15031 | −0.2815 | −0.6153 | | 0.02306 |
| 8-th order coefficient (C) | −0.0303 | −0.08 | −0.0626 | 0.45794 | 1.05146 | | −0.0474 |
| 10-th order coefficient (D) | 0.01803 | 0.15296 | 0.18967 | −0.3335 | −0.8993 | | 0.13095 |
| 12-th order coefficient (E) | 0.00424 | −0.0761 | −0.1431 | 0.07792 | 0.32568 | | −0.0793 |

|  | s8 | s9 | s10 | s11 | s12 |
|---|---|---|---|---|---|
| Conic constant (k) | 0 | 0 | −0.4178 | −5.292215 | −11.42764 |
| 4-th order coefficient (A) | −0.1047 | −0.1497 | 0.0619 | −0.021414 | −0.047915 |
| 6-th order coefficient (B) | 0.10746 | 0.08547 | 0.00304 | 0.014551 | 0.0144192 |
| 8-th order coefficient (C) | −0.1494 | −0.0823 | −0.0055 | −0.002415 | −0.003714 |
| 10-th order coefficient (D) | 0.14496 | 0.03447 | 0.00348 | 0.0001548 | 0.0005103 |
| 12-th order coefficient (E) | −0.0459 | −0.0055 | −0.0008 | −2.55E−06 | −2.67E−05 |

Figure 22:
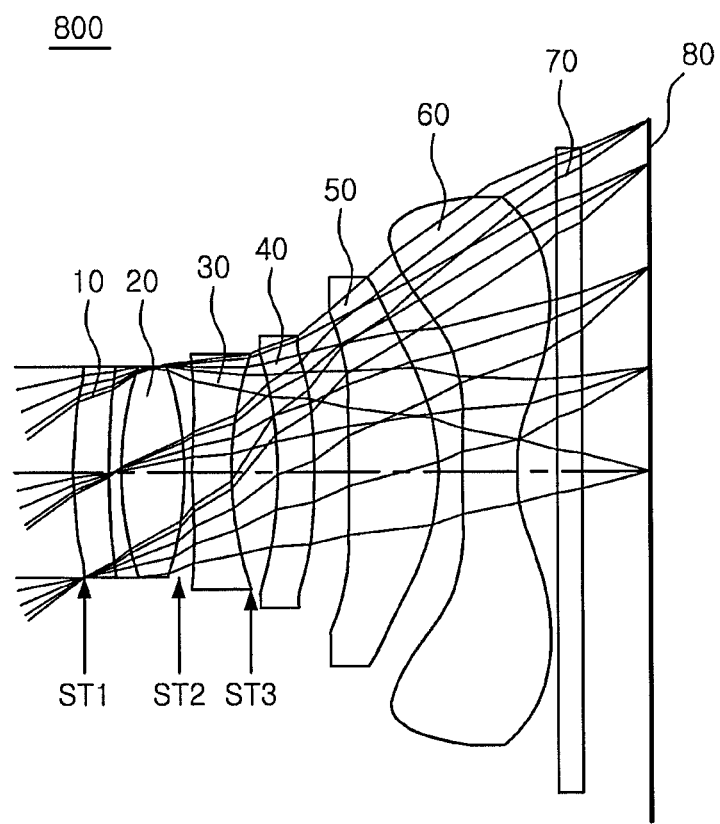
FIG. 22 is a view illustrating a configuration of a lens module according to an eighth exemplary embodiment of the present disclosure.

A lens module according to an eighth exemplary embodiment of the present disclosure will be described with reference to FIGS. 22 through 24.

A lens module 800 according to the eighth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. A first surface of the third lens 30 may be convex and a second surface thereof may be concave.

The fourth lens 40 may have negative refractive power. A first surface of the fourth lens 40 may be concave and a second surface thereof may be convex.

The fifth lens 50 may have positive refractive power. A first surface of the fifth lens 50 may be concave and a second surface thereof may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 800 according to the eighth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 800 according to the eighth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the eighth exemplary embodiment of the present disclosure, a total focal length f of the lens module 800 is 3.9 mm, F No. is 2.10, ANG is 75.0, and IMGH is 6.1 mm.

Figure 23:
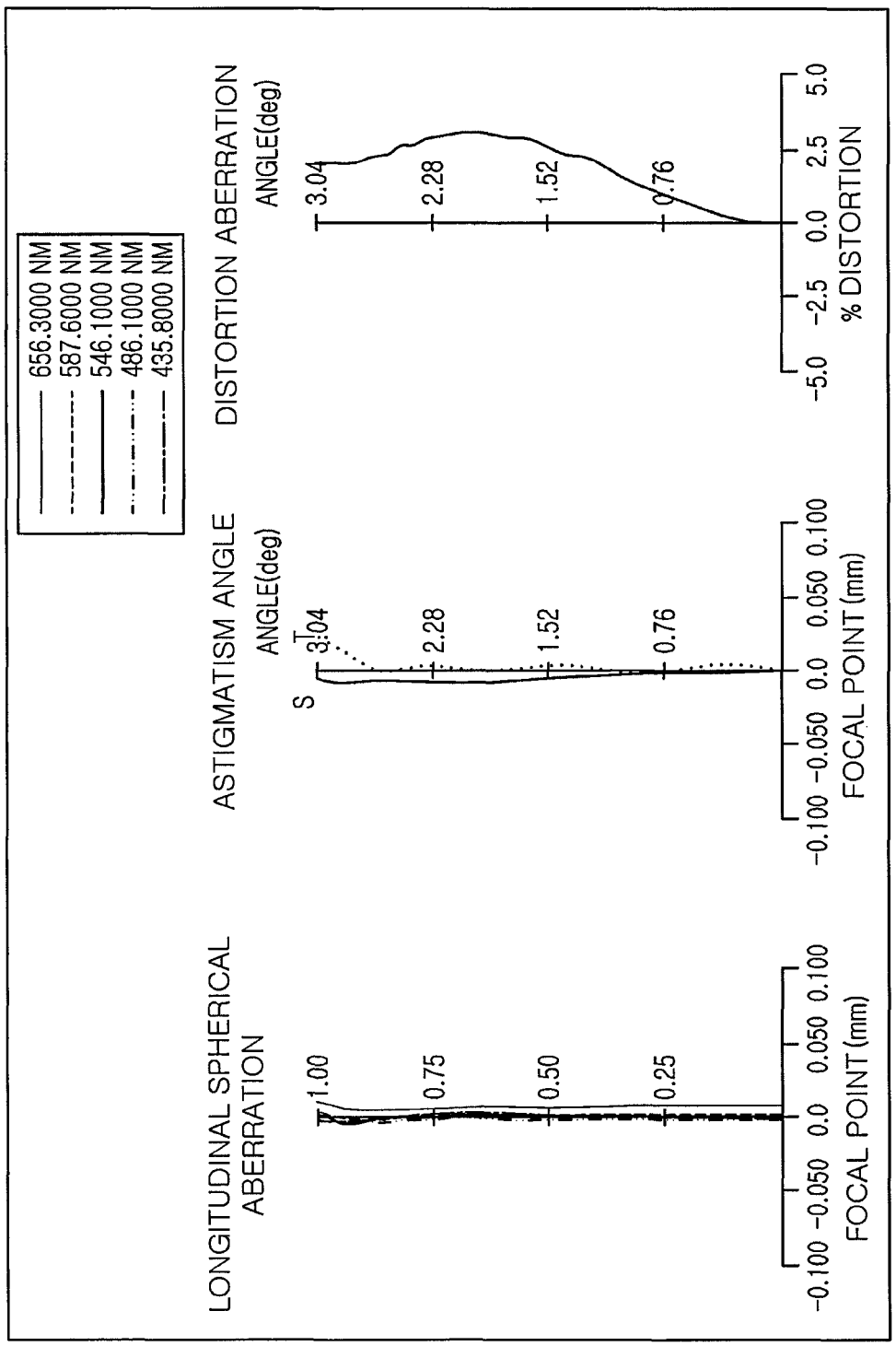
FIGS. 23 and 24 are views illustrating aberration characteristics of the lens module according to the eighth exemplary embodiment of the present disclosure.
Figure 24:
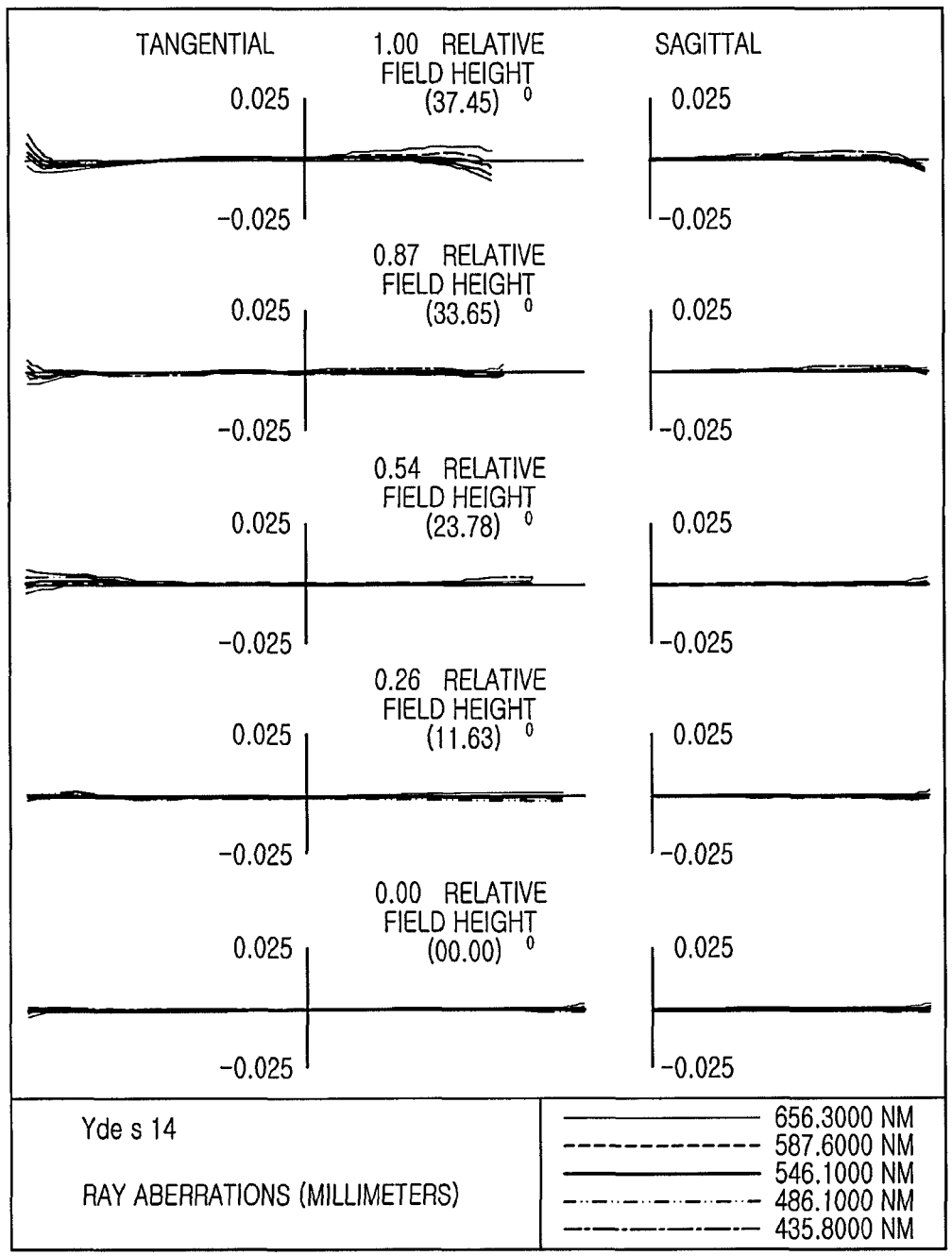

The lens module 800 configured as described above may have the aberration characteristics illustrated in FIGS. 23 and 24.

Table 15 shows lens characteristics (radii of curvature, thicknesses of lenses or distances between lenses, refractive indices, and Abbe numbers) of the lens module 800 according to the eighth exemplary embodiment of the present disclosure.

TABLE 15

|  | Radius of curvature | Thickness | Refractive index | Abbe number |
|---|---|---|---|---|
| Iris | 2.8004977 | 0.3052215 | 1.5441 | 56.092784 |
| s2 | 3.9612332 | 0.1177212 |  |  |
| s3 | 2.8395351 | 0.5430238 | 1.5441 | 56.092784 |
| s4 | −3.491577 | 0.06 |  |  |
| s5 | 13.613856 | 0.3313442 | 1.632 | 23.407407 |
| s6 | 2.5597593 | 0.4035538 |  |  |
| s7 | −4.801609 | 0.3207182 | 1.632 | 23.407407 |
| s8 | −5.985447 | 0.2989265 |  |  |
| s9 | −10.78424 | 0.7774382 | 1.5441 | 56.092784 |
| s10 | −1.481713 | 0.1947751 |  |  |
| s11 | 3.7463129 | 0.4842586 | 1.5441 | 56.092784 |
| s12 | 0.9414154 | 0.353019 |  |  |
| s13 | 1.00E+18 | 0.21 | 1.516798 | 64.1983 |
| s14 | 1.00E+18 | 0.5999717 |  |  |
| s15 | 1.00E+18 | 2.87E−05 |  |  |

Meanwhile, the surfaces of the first lens 10 to the sixth lens 60 may have the respective aspheric surface coefficients as shown in Table 16. Namely, all of the second surface of the first lens 10 to the second surface of the sixth lens 60 may be aspherical surfaces.

TABLE 16

|  | s1 | s2 | s3 | s4 | s5 | s6 | s7 |
|---|---|---|---|---|---|---|---|
| Conic constant (k) | −2.324761 | 0.0313198 | −3.056092887 | 3.9238361 | 3.8991602 | −3.933215 | 5.6552094 |
| 4-th order coefficient (A) | −0.056654 | −0.099042 | −0.01854561 | −0.008954 | −0.065909 | −0.043852 | −0.092195 |
| 6-th order coefficient (B) | −0.016661 | 0.0352181 | 0.035316173 | −0.028194 | 0.0041906 | 0.0416846 | −0.030986 |
| 8-th order coefficient (C) |  |  | −0.012590143 | 0.0268427 | 0.0290385 | −0.034537 | 0.1253071 |
| 10-th order coefficient (D) |  |  | 0.000418834 | −0.006219 | 0.0018764 | 0.0725426 | 0.0150787 |
| 12-th order coefficient (E) |  |  |  |  | −0.008107 | −0.038348 | −0.041427 |
| 14-th order coefficient (F) |  |  |  |  |  |  |  |
| 16-th order coefficient (G) |  |  |  |  |  |  |  |
| 18-th order coefficient (H) |  |  |  |  |  |  |  |
| 20-th order coefficient (I) |  |  |  |  |  |  |  |

|  | s8 | s9 | s10 | s11 | s12 |
|---|---|---|---|---|---|
| Conic constant (k) | −7.234514 | −3.00E+00 | −0.4723 | −2.611151 | −4.106061 |
| 4-th order coefficient (A) | −0.061188 | 0.09849082 | 0.2437696 | −0.246599 | −0.157597 |
| 6-th order coefficient (B) | −0.131389 | −0.20711162 | −0.288368 | 0.0455185 | 0.1031599 |
| 8-th order coefficient (C) | 0.2488728 | 0.10807185 | 0.2381975 | 0.0112877 | −0.055255 |
| 10-th order coefficient (D) | −0.156167 | 0.04578213 | −0.147686 | −0.004702 | 2.25E−02 |
| 12-th order coefficient (E) | 0.1112662 | −0.07415177 | 0.0694725 | 4.54E−04 | −6.64E−03 |
| 14-th order coefficient (F) | −0.073118 | 0.03155997 | −0.017592 |  | 1.34E−03 |
| 16-th order coefficient (G) | 0.0189553 | −0.00515136 | 0.0004697 |  | −1.74E−04 |

TABLE 16-continued

| | | |
|---|---|---|
| 18-th order coefficient (H) | 6.39E−04 | 1.30E−05 |
| 20-th order coefficient (I) | −8.40E−01 | −4.20E−07 |

Figure 25:
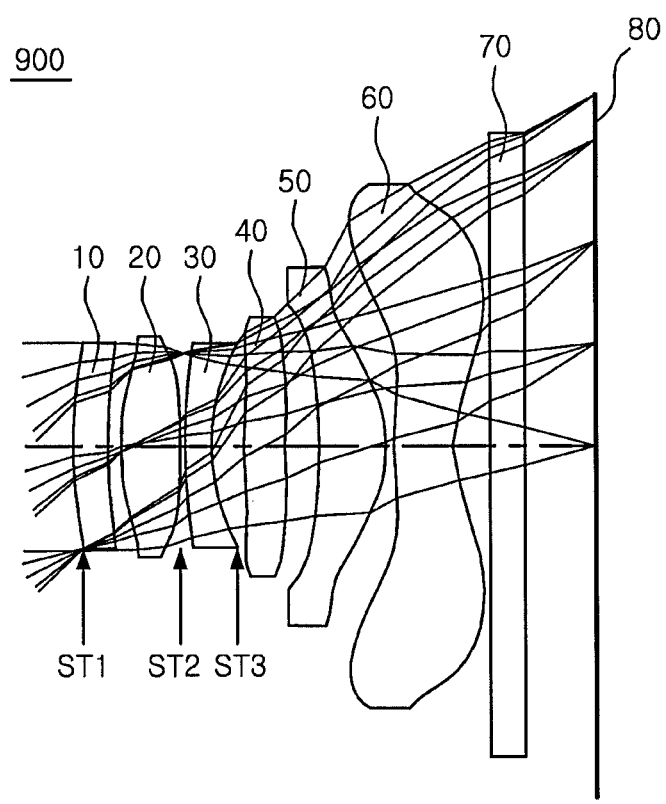
FIG. 25 is a view illustrating a configuration of a lens module according to a ninth exemplary embodiment of the present disclosure.

A lens module according to a ninth exemplary embodiment of the present disclosure will be described with reference to FIGS. 25 through 27.

A lens module 900 according to the ninth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. A first surface of the third lens 30 may be convex and a second surface thereof may be concave.

The fourth lens 40 may have positive refractive power. A first surface of the fourth lens 40 may be convex and a second surface thereof may be concave.

The fifth lens 50 may have positive refractive power. A first surface of the fifth lens 50 may be concave and a second surface thereof may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 900 according to the ninth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 900 according to the ninth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the ninth exemplary embodiment of the present disclosure, a total focal length f of the lens module 900 is 3.3 mm, F No. is 1.80, ANG is 84.6, and IMGH is 6.1 mm.

Figure 26:
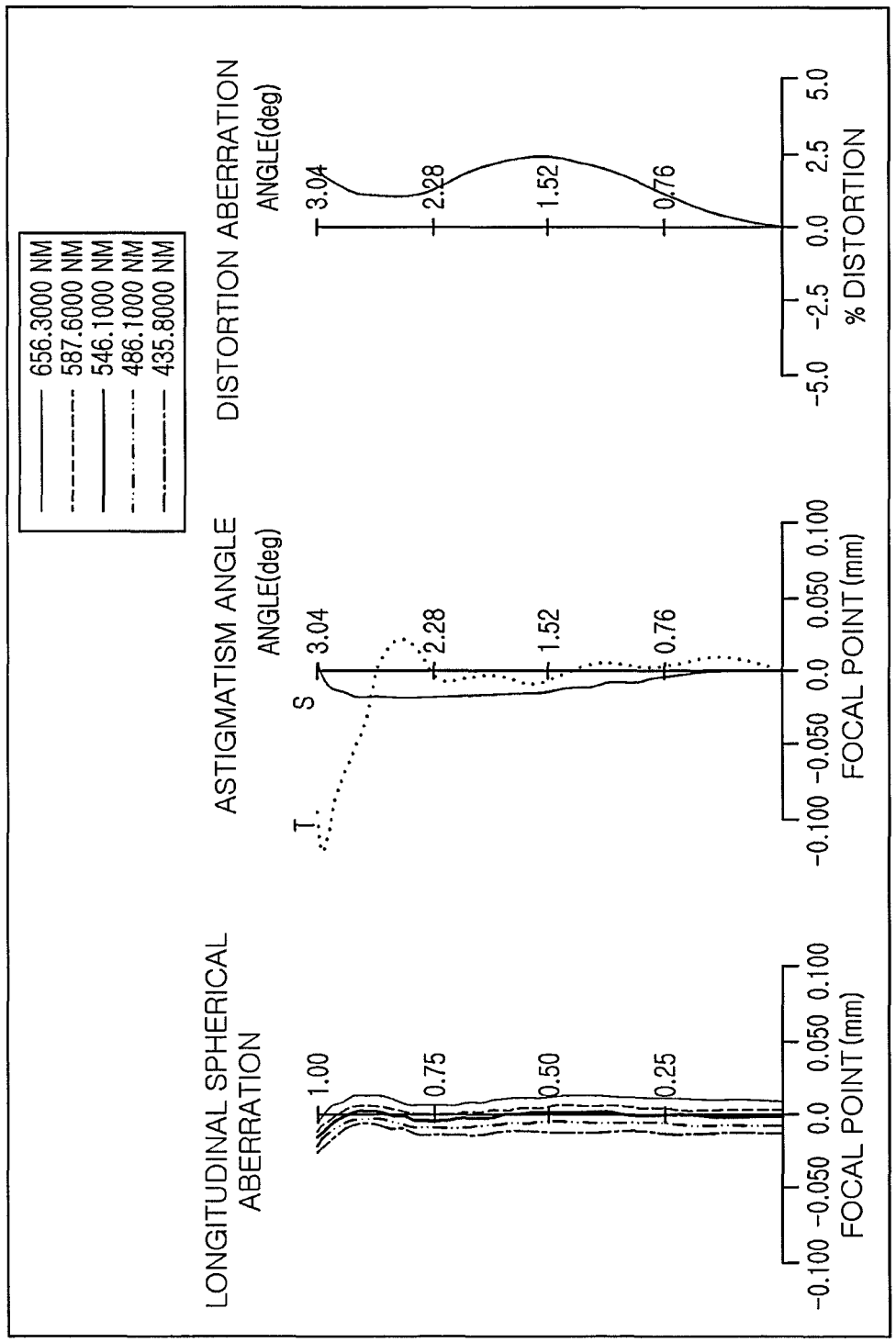
FIGS. 26 and 27 are views illustrating aberration characteristics of the lens module according to the ninth exemplary embodiment of the present disclosure.
Figure 27:
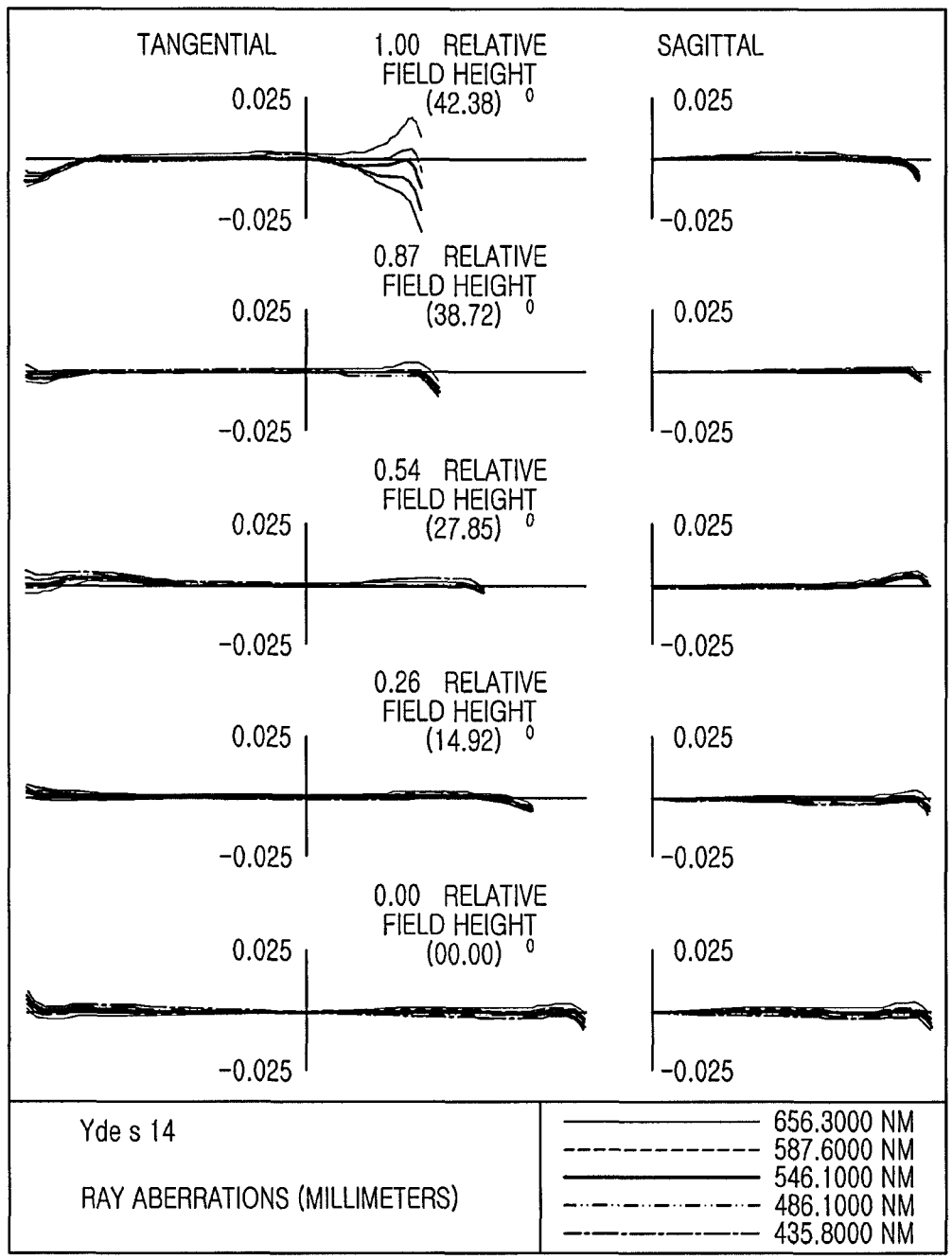

The lens module 900 configured as described above may have the aberration characteristics illustrated in FIGS. 26 and 27.

Table 17 shows lens characteristics (radii of curvature, thicknesses of lenses or distances between lenses, refractive indices, and Abbe numbers) of the lens module 900 according to the ninth exemplary embodiment of the present disclosure.

TABLE 17

| | Radius of curvature | Thickness | Refractive index | Abbe number |
|---|---|---|---|---|
| Iris | 3.8681713 | 0.285793 | 1.693501 | 53.2316 |
| s2 | 4.72969 | 0.1179205 | | |
| s3 | 2.3195452 | 0.5038686 | 1.5441 | 56.092784 |
| s4 | −5.0709684 | 0.06 | | |
| s5 | 3.623866 | 0.23 | 1.632 | 23.407407 |
| s6 | 1.6290245 | 0.2644317 | | |
| s7 | 5.4490595 | 0.3576973 | 1.632 | 23.407407 |
| s8 | 7.4842003 | 0.287385 | | |
| s9 | −3.8658415 | 0.5924242 | 1.5441 | 56.092784 |
| s10 | −0.9945044 | 0.0713057 | | |
| s11 | 3.2074183 | 0.5022149 | 1.5441 | 56.092784 |
| s12 | 0.8388671 | 0.3269591 | | |
| s13 | 1.00E+18 | 0.3 | 1.516798 | 64.1983 |
| s14 | 1.00E+18 | 0.5984704 | | |
| s15 | 1.00E+18 | 1.52E−03 | | |

Meanwhile, the surfaces of the first lens 10 to the sixth lens 60 may have the respective aspheric surface coefficients as shown in Table 18. Namely, all of the second surface of the first lens 10 to the second surface of the sixth lens 60 may be aspherical surfaces.

TABLE 18

| | s1 | s2 | s3 | s4 | s5 | s6 | s7 |
|---|---|---|---|---|---|---|---|
| Conic constant (k) | −5.8720247 | −7.381024 | −3.353306294 | 9.1058514 | −20 | −1.145639 | −8.675731 |
| 4-th order coefficient (A) | −0.0495742 | −0.065279 | 0.011001123 | 0.0275696 | −0.020074 | −0.1077 | −0.118535 |
| 6-th order coefficient (B) | 0.0141316 | 0.050307 | −0.000393179 | −0.215458 | −0.107447 | 0.1731622 | 0.0592381 |
| 8-th order coefficient (C) | | | −0.00826106 | 0.2044469 | 0.0775508 | −0.249942 | 0.018698 |

TABLE 18-continued

|  |  |  |  |  |  |
|---|---|---|---|---|---|
| 10-th order coefficient (D) | −0.034292507 | −0.091683 | 0.0459439 | 0.245525 | −0.092623 |
| 12-th order coefficient (E) |  | 0 | −0.018269 | −0.085893 | 0.0693046 |
| 14-th order coefficient (F) |  |  |  |  |  |
| 16-th order coefficient (G) |  |  |  |  |  |
| 18-th order coefficient (H) |  |  |  |  |  |
| 20-th order coefficient (I) |  |  |  |  |  |

|  | s8 | s9 | s10 | s11 | s12 |
|---|---|---|---|---|---|
| Conic constant (k) | 20 | −3.87E+00 | −0.650948 | −0.334571 | −4.670036 |
| 4-th order coefficient (A) | −0.103349 | 5.57936392 | 0.3697744 | −0.324117 | −0.161066 |
| 6-th order coefficient (B) | −0.044158 | 0.11793135 | −0.615634 | 0.1223324 | 0.094199 |
| 8-th order coefficient (C) | 0.1019127 | −0.18059175 | 1.0797395 | −0.016524 | −0.0331 |
| 10-th order coefficient (D) | −0.200637 | 0.01675655 | −1.477693 | 5.77E−05 | −2.91E−03 |
| 12-th order coefficient (E) | 0.2132291 | 0.2579016 | 1.4822455 | 1.18E−04 | 8.92E−03 |
| 14-th order coefficient (F) | −0.156827 | −0.34158634 | −0.945508 |  | −4.26E−03 |
| 16-th order coefficient (G) | 0.0625372 | 0.17450368 | 0.3564351 |  | 1.01E−03 |
| 18-th order coefficient (H) |  | −0.03181146 | −7.25E−02 |  | −1.23E−04 |
| 20-th order coefficient (I) |  |  | 6.16E−03 |  |  |

Figure 28:
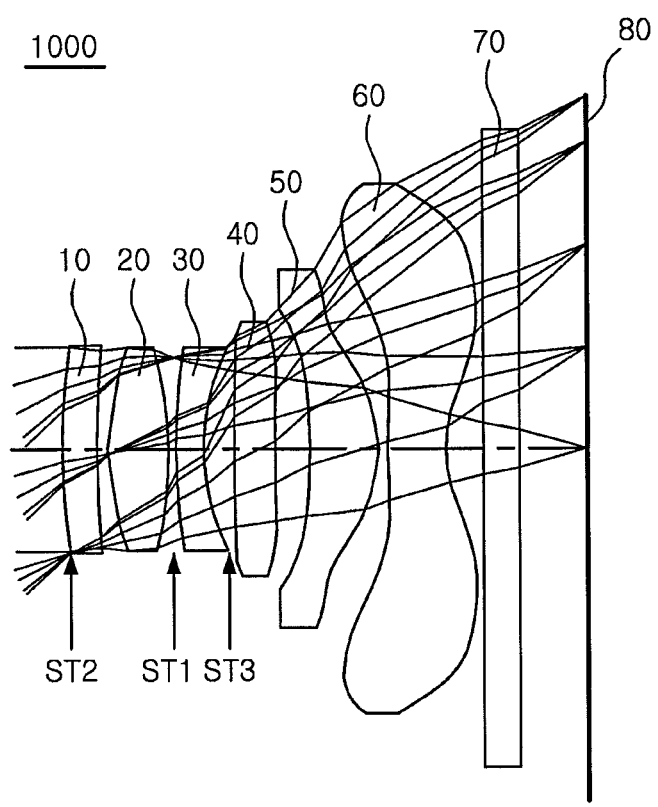
FIG. 28 is a view illustrating a configuration of a lens module according to a tenth exemplary embodiment of the present disclosure.

A lens module according to a tenth exemplary embodiment of the present disclosure will be described with reference to FIGS. 28 through 30.

A lens module 1000 according to the tenth exemplary embodiment of the present disclosure may include an optical system composed of a first lens 10, a second lens 20, a third lens 30, a fourth lens 50, a fifth lens 50, and a sixth lens 60, and may further include an IR cutoff filter 70 and an image sensor 80.

In the present exemplary embodiment, the first lens 10 may have positive refractive power. A first surface of the first lens 10 may be convex and a second surface thereof may be concave.

The second lens 20 may have positive refractive power. Both surfaces of the second lens 20 may be convex.

The third lens 30 may have negative refractive power. A first surface of the third lens 30 may be convex and a second surface thereof may be concave.

The fourth lens 40 may have positive refractive power. A first surface of the fourth lens 40 may be convex and a second surface thereof may be concave.

The fifth lens 50 may have positive refractive power. A first surface of the fifth lens 50 may be concave and a second surface thereof may be convex.

The sixth lens 60 may have negative refractive power. A first surface of the sixth lens 60 may be convex and a second surface thereof may be concave. Also, the sixth lens 60 may have a point of inflection on a surface thereof. For example, the second surface of the sixth lens 60 may have a point of inflection thereon.

The lens module 1000 according to the tenth exemplary embodiment of the present disclosure may include one or more irises ST1, ST2, and ST3. For example, the first iris ST1 may be disposed in front of the first lens 10, the second iris ST2 may be disposed between the second lens 20 and the third lens 30, and the third iris ST3 may be disposed between the third lens 30 and the fourth lens 40.

Here, the first iris ST1 may be an aperture stop provided to adjust a quantity of light, and the second iris ST2 and the third iris ST3 may be irises for vignetting. In the present exemplary embodiment, the second iris ST2 and the third iris ST3 are provided for vignetting, but the present inventive concept is not limited thereto and at least one of the second iris ST2 and the third iris ST3 may be provided for vignetting.

Coma aberration is proportional to the square of an aperture (size) of a lens, and astigmatism is proportional to an aperture of a lens. Thus, as an aperture of a lens is increased, coma aberration and astigmatism are also increased.

Thus, in the lens module 1000 according to the tenth exemplary embodiment of the present disclosure, the second iris ST2 and the third iris ST3 may be provided to vignette a bundle of rays at edges (i.e., margin portions of lenses) distant from a central portion of the lenses (namely, to cut off a portion of light having large coma aberration), thus implementing a clear image.

In the tenth exemplary embodiment of the present disclosure, a total focal length f of the lens module 1000 is 3.2 mm, F No. is 1.90, ANG is 85.0, and IMGH is 6.1 mm.

Figure 29:
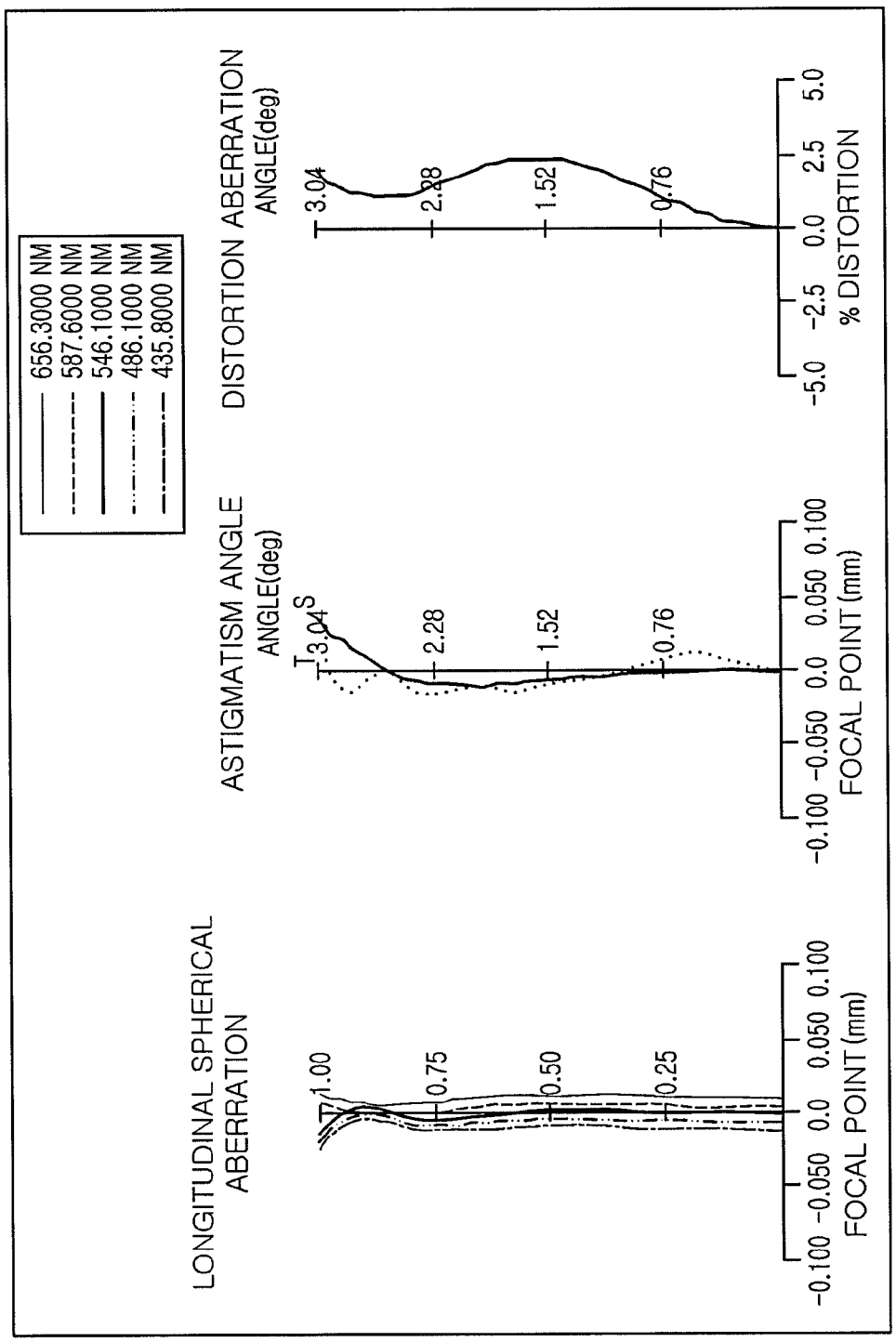
FIGS. 29 and 30 are views illustrating aberration characteristics of the lens module according to the tenth exemplary embodiment of the present disclosure.
Figure 30:
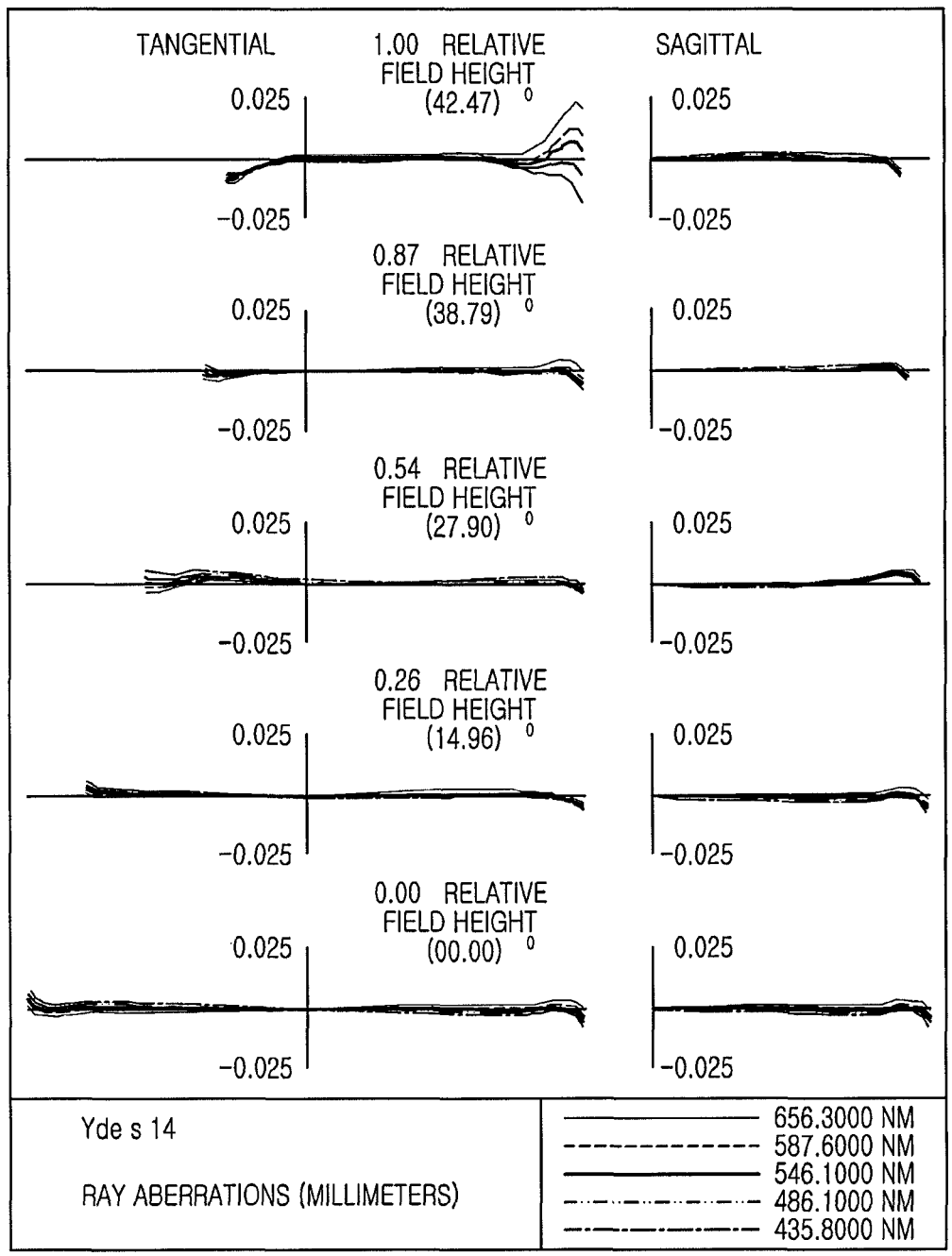

The lens module 1000 configured as described above may have the aberration characteristics illustrated in FIGS. 29 and 30.

Table 19 shows lens characteristics (radii of curvature, thicknesses of lenses or distances between lenses, refractive indices, and Abbe numbers) of the lens module 1000 according to the tenth exemplary embodiment of the present disclosure.

TABLE 19

|  | Radius of curvature | Thickness | Refractive index | Abbe number |
|---|---|---|---|---|
| s1 | 4.4977251 | 0.2771724 | 1.5441 | 56.092784 |
| s2 | 5.3179338 | 0.1064662 |  |  |
| s3 | 2.1657584 | 0.5131434 | 1.5441 | 56.092784 |
| s4 | −5.1381913 | 0.06 |  |  |
| Iris | 1.00E+18 | 0 |  |  |
| s6 | 3.5398572 | 0.23 | 1.632 | 23.407407 |
| s7 | 1.6053463 | 0.269663 |  |  |
| s8 | 5.2298556 | 0.3532809 | 1.5441 | 56.092784 |
| s9 | 7.3852736 | 0.3009893 |  |  |
| s10 | −3.6194821 | 0.5848991 | 1.5441 | 56.092784 |
| s11 | −0.9929547 | 0.0753507 |  |  |
| s12 | 3.0141321 | 0.498749 | 1.5441 | 56.092784 |

TABLE 19-continued

|  | Radius of curvature | Thickness | Refractive index | Abbe number |
|---|---|---|---|---|
| s13 | 8.27E−01 | 0.330286 |  |  |
| s14 | 1.00E+18 | 0.3 | 1.516798 | 64.1983 |
| s15 | 1.00E+18 | 5.99E−01 |  |  |
| s16 | 1.00E+18 | 0.0011317 |  |  |

Meanwhile, the surfaces of the first lens 10 to the sixth lens 60 may have the respective aspheric surface coefficients as shown in Table 20. Namely, all of the second surface of the first lens 10 to the second surface of the sixth lens 60 may be aspherical surfaces.

TABLE 20

|  | s1 | s2 | s3 | s4 | s6 | s7 |
|---|---|---|---|---|---|---|
| Conic constant (k) | −7.5352006 | −7.381024 | −3.339706889 | 9.1058514 | −20 | −1.20488 |
| 4-th order coefficient (A) | −0.0623839 | −0.079954 | 0.019112148 | 0.0245499 | −0.028998 | −0.114685 |
| 6-th order coefficient (B) | 0.0203669 | 0.0616171 | −0.012820024 | −0.228874 | −0.115803 | 0.1776915 |
| 8-th order coefficient (C) |  |  | −0.002108271 | 0.2174839 | 0.1013589 | −0.245732 |
| 10-th order coefficient (D) |  |  | −0.048194036 | −0.101437 | 0.0272555 | 0.2398218 |
| 12-th order coefficient (E) |  |  |  |  | −0.004874 | −0.081133 |
| 14-th order coefficient (F) |  |  |  |  |  |  |
| 16-th order coefficient (G) |  |  |  |  |  |  |
| 18-th order coefficient (H) |  |  |  |  |  |  |
| 20-th order coefficient (I) |  |  |  |  |  |  |

|  | s8 | s9 | s10 | s11 | s12 |
|---|---|---|---|---|---|
| Conic constant (k) | −8.675731 | 2.00E+01 | 5.5330984 | −0.649475 | −0.529133 |
| 4-th order coefficient (A) | −0.118749 | −0.10524338 | 0.1233852 | 0.3704107 | −0.330407 |
| 6-th order coefficient (B) | 0.0588052 | −0.04227943 | −0.177615 | −0.618829 | 0.1231607 |
| 8-th order coefficient (C) | 0.0229405 | 0.11435625 | −0.00578 | 1.0936932 | −0.015224 |
| 10-th order coefficient (D) | −0.109495 | −0.24532315 | 0.3101629 | −1.52E+00 | −5.02E−04 |
| 12-th order coefficient (E) | 0.0823342 | 0.28140154 | −0.389443 | 1.56E+00 | 1.80E−04 |
| 14-th order coefficient (F) |  | −0.21229731 | 0.1931346 | −1.019594 |  |
| 16-th order coefficient (G) |  | 0.08229736 | −0.034374 | 3.92E−01 |  |
| 18-th order coefficient (H) |  |  |  | −0.081106 |  |
| 20-th order coefficient (I) |  |  |  | 0.0070049 |  |

Meanwhile, referring to Table 21, all of the lens modules according to the first to tenth exemplary embodiments of the present disclosure satisfy condition expressions 1 through 6.

TABLE 21

|  | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| TTL | 5.1 | 5.2 | 5.1 | 5.8 | 5.8 | 5.8 | 5.2 | 5.0 | 4.5 | 4.5 |
| ImgH | 6.1 | 6.1 | 6.1 | 6.1 | 6.1 | 6.1 | 6.1 | 6.1 | 6.1 | 6.1 |
| SL | 5.1 | 5.2 | 5.1 | 5.8 | 5.8 | 5.8 | 5.2 | 5.0 | 4.5 | 3.5 |

TABLE 21-continued

|  | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| ANG | 74.0 | 74.0 | 74.0 | 70.0 | 70.0 | 70.0 | 73.0 | 75.0 | 84.6 | 85.0 |
| E.F.L. | 4.0 | 4.0 | 4.0 | 4.4 | 4.4 | 4.2 | 4.0 | 3.9 | 3.3 | 3.2 |
| Fno. | 2.2 | 2.2 | 2.2 | 1.9 | 1.8 | 1.6 | 2.2 | 2.1 | 1.8 | 1.9 |
| L1S1 diameter | 1.83 | 1.84 | 1.80 | 2.30 | 2.40 | 2.60 | 2.60 | 1.80 | 1.80 | 1.76 |
| TTL/ImgH | 0.8 | 0.8 | 0.8 | 0.9 | 0.9 | 0.9 | 0.9 | 0.8 | 0.7 | 0.7 |
| SL/TTL | 1.0 | 1.0 | 1.0 | 1.0 | 1.0 | 1.0 | 1.0 | 1.0 | 1.0 | 0.8 |
| ANG/Fno. | 33.6 | 33.6 | 33.2 | 37.0 | 38.7 | 42.9 | 33.2 | 35.0 | 46.0 | 45.5 |
| ANG / (Fno * TTL) | 6.6 | 6.5 | 6.5 | 6.4 | 6.7 | 7.5 | 6.4 | 7.0 | 10.3 | 10.1 |

As set forth above, a lens module according to exemplary embodiments of the present disclosure may have enhanced aberration improvement effect, implement high resolution, and satisfy the requirements of light weight and low costs.

In addition, by having irises for vignetting, a bright lens module (low F no.) may be provided.

While exemplary embodiments have been shown and described above, it will be apparent to those skilled in the art that modifications and variations could be made without departing from the spirit and scope of the present disclosure as defined by the appended claims.

What is claimed is:

1. A lens module, comprising:
a first lens having positive refractive power;
a second lens having positive refractive power;
a third lens having negative refractive power;
a fourth lens having refractive power;
a fifth lens having positive refractive power;
a sixth lens having refractive power and a shape in which an image side surface thereof is concave toward an image side;
wherein the first to sixth lenses are sequentially disposed from an object side;
wherein the lens module satisfies the following expression:

$0.44 < L1S1/EFL < 0.66$; and wherein L1S1 is a diameter (mm) of an object side surface of the first lens, and EFL is an effective focal length of the lens module.

2. The lens module of claim 1, wherein a first iris is provided on an object side of the first lens.

3. The lens module of claim 1, wherein the first lens has a shape in which an object side surface thereof is convex toward an object side.

4. A lens module, comprising:
a first lens having positive refractive power;
a second lens having positive refractive power;
a third lens having negative refractive power;
a fourth lens having refractive power;
a fifth lens having positive refractive power;
a sixth lens having refractive power and a shape in which an image side surface thereof is concave toward an image side;
wherein the first to sixth lenses are sequentially disposed from an object side; and
wherein the second lens has a shape in which both surfaces thereof are convex.

5. The lens module of claim 1, wherein the third lens has a shape in which both surfaces thereof are concave.

6. The lens module of claim 1, wherein the fourth lens has a meniscus shape and is convex toward an object side.

7. The lens module of claim 1, wherein the fifth lens has a shape in which an object side surface thereof is concave toward the object side.

8. The lens module of claim 1, wherein the fifth lens has a meniscus shape and is convex toward the image side.

9. The lens module of claim 1, wherein the sixth lens has a shape in which an object side surface thereof is concave toward the object side.

10. The lens module of claim 1, wherein the sixth lens has at least one point of inflection formed on the image side surface thereof.

11. The lens module of claim 1, wherein the first lens to the sixth lens are formed of plastic.

12. The lens module of claim 1, wherein at least one of an object side surface and an image side surface of each of the first lens to the sixth lens is an aspherical surface.

13. The lens module of claim 1, wherein the lens module satisfies the following expression:

$TTL/IMGH < 2.0$;

wherein TTL is a distance (mm) from an object side surface of the first lens to an image surface, and IMGH is a diagonal length (mm) of an image sensor.

14. The lens module of claim 2, wherein the lens module satisfies the following expression:

$0.7 < SL/TTL < 1.1$;

wherein SL is a distance (mm) from a first iris to an image surface, and TTL is a distance (mm) from an object side surface of the first lens to the image surface.

15. The lens module of claim 1, wherein the lens module satisfies the following expression:

$ANG/F\text{-number} > 33$;

wherein ANG is a field of view of the lens module and F-number indicates brightness of the lens module.

16. The lens module of claim 1, wherein the lens module satisfies the following expression:

$F\text{-number} < 2.3$;

wherein F-number indicates brightness of the lens module.

17. The lens module of claim 1, wherein the lens module satisfies the following expression:

$6 < ANG/(F\text{-number}*TTL) < 11$;

wherein ANG is a field of view of the lens module, F-number indicates brightness of the lens module, and TTL is a distance (mm) from an object side surface of the first lens to an image surface.

18. A lens module, comprising:
a first lens having positive refractive power;
a second lens having positive refractive power;

a third lens having negative refractive power;
a fourth lens having refractive power;
a fifth lens having positive refractive power; and
a sixth lens having refractive power, a shape in which an image side surface thereof is concave toward an image side, and at least one point of inflection thereon,
wherein a first iris is provided on an object side of the first lens and a second iris is provided between the second lens and the third lens.

19. The lens module of claim 18, wherein the first lens has a shape in which an object side surface thereof is convex toward an object side.

20. The lens module of claim 18, wherein the second lens has a shape in which both surfaces thereof are convex.

21. The lens module of claim 18, wherein the fifth lens has a shape in which an image side surface thereof is convex toward the image side.

22. The lens module of claim 18, wherein the sixth lens has a shape in which the image side surface thereof is concave toward the image side.

23. The lens module of claim 18, wherein a third iris is provided between the third lens and the fourth lens.

24. The lens module of claim 18, wherein the lens module satisfies the following expression:

$TTL/IMGH<2.0;$ wherein TTL is a distance (mm) from an object side surface of the first lens to an image surface, and IMGH is a diagonal length (mm) of an image sensor.

25. The lens module of claim 18, wherein the lens module satisfies the following expression:

$0.7<SL/TTL<1.1;$ wherein SL is a distance (mm) from a first iris to an image surface, and TTL is a distance (mm) from an object side surface of the first lens to the image surface.

26. The lens module of claim 18, wherein the lens module satisfies the following expression:

$ANG/F\text{-number}>33;$ wherein ANG is a field of view of the lens module, and F-number indicates brightness of the lens module.

27. The lens module of claim 18, wherein the lens module satisfies the following expression:

$F\text{-number}<2.3;$ wherein F-number indicates brightness of the lens module.

28. The lens module of claim 18, wherein the lens module satisfies the following expression:

$6<ANG/(F\text{-number}*TTL)<11;$ wherein ANG is a field of view of the lens module, F-number indicates brightness of the lens module, and TTL is a distance (mm) from an object side surface of the first lens to an image surface.

29. The lens module of claim 18, wherein the lens module satisfies the following expression:

$0.44<L1S1/EFL<0.66;$ wherein L1S1 is a diameter (mm) of an object side surface of the first lens, and EFL is an effective focal length of the lens module.

* * * * *